US012423977B2

(12) United States Patent
Chen et al.

(10) Patent No.: US 12,423,977 B2
(45) Date of Patent: Sep. 23, 2025

(54) METHOD FOR VIDEO MOMENT RETRIEVAL, COMPUTER SYSTEM, NON-TRANSITORY COMPUTER-READABLE MEDIUM

(71) Applicant: INNOPEAK TECHNOLOGY, INC., Palo Alto, CA (US)

(72) Inventors: Jiawei Chen, Palo Alto, CA (US); Jenhao Hsiao, Palo Alto, CA (US)

(73) Assignee: INNOPEAK TECHNOLOGY, INC., Palo Alto, CA (US)

( * ) Notice: Subject to any disclaimer, the term of this patent is extended or adjusted under 35 U.S.C. 154(b) by 318 days.

(21) Appl. No.: 18/365,458

(22) Filed: Aug. 4, 2023

(65) Prior Publication Data

US 2024/0037948 A1 Feb. 1, 2024

Related U.S. Application Data

(63) Continuation of application No. PCT/US2021/019817, filed on Feb. 26, 2021.

(51) Int. Cl.
*G06V 20/40* (2022.01)
*G06F 16/732* (2019.01)
(Continued)

(52) U.S. Cl.
CPC ............ *G06V 20/46* (2022.01); *G06F 16/732* (2019.01); *G06V 10/761* (2022.01); *G06V 10/774* (2022.01); *G06V 20/49* (2022.01)

(58) Field of Classification Search
CPC .................................................... G06F 16/732
See application file for complete search history.

(56) References Cited

U.S. PATENT DOCUMENTS

| 10,839,223 | B1* | 11/2020 | Jiang ................ G06V 20/46 |
| 2020/0175061 | A1 | 6/2020 | Penta et al. |
| 2021/0014574 | A1 | 1/2021 | Batmanglidj et al. |

FOREIGN PATENT DOCUMENTS

| JP | 2020115321 A | 7/2020 |
| KR | 20140077535 A | 6/2014 |
| KR | 20160031226 A | 3/2016 |

OTHER PUBLICATIONS

Zhang et al, "Span-based Localizing Network for Natural Language Video Localization" (published at Proceedings of the 58th Annual Meeting of the Association for Computational Linguistics, pp. 6543-6554, Jul. 2020).*

(Continued)

*Primary Examiner* — Casey L Kretzer
(74) *Attorney, Agent, or Firm* — Ladas & Parry LLP

(57) ABSTRACT

An electronic device obtains video content and a textual query associated with a video moment in the video content. The video content is divided video segments, and the textual query includes one or more words. Visual features are extracted for each video segment, and textual features are extracted for each word. The visual features and the textual features are combined to generate a similarity matrix in which each element represents a similarity level between a respective video segment and a respective word. Segment-attended sentence features are generated for the textual query based on the textual features and the similarity matrix. The segment-attended sentence features are combined with the visual features of the video segments to determine a plurality of alignment scores, which is used to retrieve a subset of the video content associated with the textual query to be retrieved from the video segments.

20 Claims, 12 Drawing Sheets

(51) Int. Cl.
*G06V 10/74* (2022.01)
*G06V 10/774* (2022.01)

(56) References Cited

OTHER PUBLICATIONS

Gao, J.; Sun, C.; Yang,Z.; and Nevatia,R. 2017.Tall: Temporal activity localization via language query. In IEEE CVPR,5267-5275.
Mithun, Niluthpol Chowdhury, Sujoy Paul, and AmitK.Roy-Chowdhury. "Weakly supervised video moment retrieval from text queries." Proceedings of the IEEE Conference on Computer Vision and Pattern Recognition.2019.
Pennington, Jeffrey, Richard Socher, and Christopher D.Manning. "Glove:Global vectorsfor word representation." Proceedings of the 2014 conference on empirical methods in naturallanguage processing (EMNLP).2014.
International Search Report, International Application No. PCT/US2021/019817, mailed Nov. 24, 2021 (7 pages).

\* cited by examiner

METHOD FOR VIDEO MOMENT RETRIEVAL, COMPUTER SYSTEM, NON-TRANSITORY COMPUTER-READABLE MEDIUM

CROSS REFERENCE

The present application is a continuation-application of International (PCT) Patent Application No. PCT/US2021/019817, filed on Feb. 26, 2021, the entire contents of which are hereby incorporated by reference in its entirety.

TECHNICAL FIELD

This application relates generally to data processing technology including, but not limited to, methods, systems, and non-transitory computer-readable media for retrieving a video moment from video content based on textual description of the video moment or based on a textual query regarding the video moment.

BACKGROUND

Text-based video moment retrieval aims to identify in untrimmed video data a video moment that is most relevant to a textual item (e.g., a textual query, text description). This has remained a challenge because it is difficult to align language and visual modals based on large-scale labeled datasets. Many existing approaches operate in a fully-supervised manner and rely on a training dataset containing pairs of text description and video segment annotated with temporal boundaries. Such supervised learning is extraordinarily time-consuming and expensive. The temporal boundaries of certain moments can be ambiguous and make it even harder to obtain accurate annotations. It would be beneficial to develop systems and methods to retrieve a video moment from untrimmed video data based on textual information without requiring fully-supervised learning.

SUMMARY

In one aspect, a method is implemented at a computer system for retrieving a video moment. The method includes obtaining video content and a textual query associated with the video moment. The video content includes a plurality of video segments, and the textual query includes one or more words. The method further includes extracting a plurality of visual features for the video segments of the video content, extracting one or more textual features for the one or more words in the textual query, and combining the visual features of the plurality of video segments and the textual features of the one or more words to generate a similarity matrix. Each element of the similarity matrix represents a similarity level between a respective one of the video segments and a respective one of the words. The method further includes generating one or more segment-attended sentence features for the textual query based on the one or more textual features for the one or more words in the textual query and the similarity matrix and combining the visual features of the plurality of video segments and the segment-attended sentence features of the textual query to generate a plurality of alignment scores. The method further includes retrieving a subset of the video content associated with the textual query from the video segments based on the plurality of alignment scores. The subset of the video content corresponds to the video moment.

In another aspect, some implementations include a computer system including one or more processors and memory having instructions stored thereon, which when executed by the one or more processors cause the processors to perform any of the above methods.

In yet another aspect, some implementations include a non-transitory computer-readable medium, having instructions stored thereon, which when executed by one or more processors cause the processors to perform any of the above methods.

BRIEF DESCRIPTION OF THE DRAWINGS

For a better understanding of the various described implementations, reference should be made to the Detailed Description below, in conjunction with the following drawings in which like reference numerals refer to corresponding parts throughout the figures.

Like reference numerals refer to corresponding parts throughout the several views of the drawings.

DETAILED DESCRIPTION

Reference will now be made in detail to specific embodiments, examples of which are illustrated in the accompanying drawings. In the following detailed description, numerous non-limiting specific details are set forth in order to assist in understanding the subject matter presented herein. But it will be apparent to one of ordinary skill in the art that various alternatives may be used without departing from the scope of claims and the subject matter may be practiced without these specific details. For example, it will be apparent to one of ordinary skill in the art that the subject matter presented herein can be implemented on many types of electronic devices with digital video capabilities.

Figure 1:
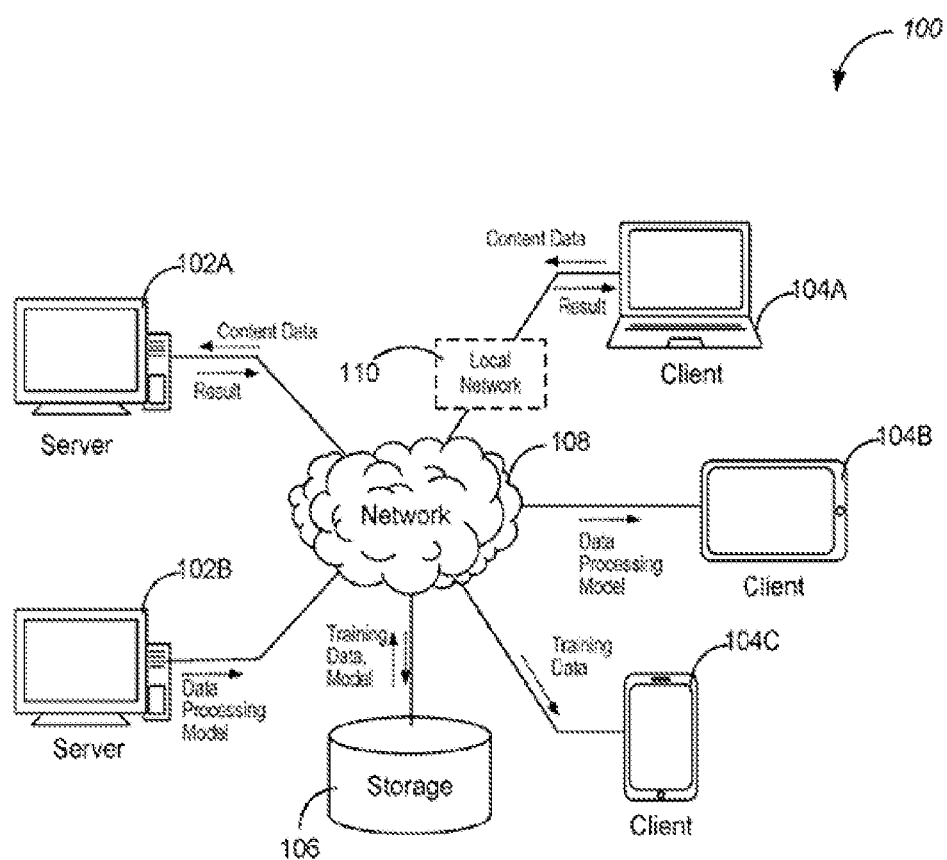
FIG. 1 is an example data processing environment having one or more servers communicatively coupled to one or more client devices, in accordance with some embodiments.

FIG. 1 is an example data processing environment 100 having one or more servers 102 communicatively coupled to one or more client devices 104, in accordance with some embodiments. The one or more client devices 104 may be, for example, desktop computers 104A, tablet computers 104B, mobile phones 104C, or intelligent, multi-sensing, network-connected home devices (e.g., a camera). Each client device 104 can collect data or user inputs, executes user applications, and present outputs on its user interface. The collected data or user inputs can be processed locally at the client device 104 and/or remotely by the server(s) 102. The one or more servers 102 provides system data (e.g., boot files, operating system images, and user applications) to the client devices 104, and in some embodiments, processes the data and user inputs received from the client device(s) 104 when the user applications are executed on the client devices 104. In some embodiments, the data processing environment 100 further includes a storage 106 for storing data related to the servers 102, client devices 104, and applications executed on the client devices 104.

The one or more servers 102 can enable real-time data communication with the client devices 104 that are remote from each other or from the one or more servers 102. Further, in some embodiments, the one or more servers 102 can implement data processing tasks that cannot be or are preferably not completed locally by the client devices 104. For example, the client devices 104 include a game console that executes an interactive online gaming application. The game console receives a user instruction and sends it to a game server 102 with user data. The game server 102 generates a stream of video data based on the user instruction and user data and providing the stream of video data for display on the game console and other client devices that are engaged in the same game session with the game console. In another example, the client devices 104 include a networked surveillance camera and a mobile phone 104C. The networked surveillance camera collects video data and streams the video data to a surveillance camera server 102 in real time. While the video data is optionally pre-processed on the surveillance camera, the surveillance camera server 102 processes the video data to identify motion or audio events in the video data and share information of these events with the mobile phone 104C, thereby allowing a user of the mobile phone 104 to monitor the events occurring near the networked surveillance camera in the real time and remotely.

The one or more servers 102, one or more client devices 104, and storage 106 are communicatively coupled to each other via one or more communication networks 108, which are the medium used to provide communications links between these devices and computers connected together within the data processing environment 100. The one or more communication networks 108 may include connections, such as wire, wireless communication links, or fiber optic cables. Examples of the one or more communication networks 108 include local area networks (LAN), wide area networks (WAN) such as the Internet, or a combination thereof. The one or more communication networks 108 are, optionally, implemented using any known network protocol, including various wired or wireless protocols, such as Ethernet, Universal Serial Bus (USB), FIREWIRE, Long Term Evolution (LTE), Global System for Mobile Communications (GSM), Enhanced Data GSM Environment (EDGE), code division multiple access (CDMA), time division multiple access (TDMA), Bluetooth, Wi-Fi, voice over Internet Protocol (VoIP), Wi-MAX, or any other suitable communication protocol. A connection to the one or more communication networks 108 may be established either directly (e.g., using 3G/4G connectivity to a wireless carrier), or through a network interface 110 (e.g., a router, switch, gateway, hub, or an intelligent, dedicated whole-home control node), or through any combination thereof. As such, the one or more communication networks 108 can represent the Internet of a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages.

Deep learning techniques are applied in the data processing environment 100 to process content data (e.g., video, image, audio, or textual data) obtained by an application executed at a client device 104 to identify information contained in the content data, match the content data with other data, categorize the content data, or synthesize related content data. In these deep learning techniques, data processing models are created based on one or more neural networks to process the content data. These data processing models are trained with training data before they are applied to process the content data. In some embodiments, both model training and data processing are implemented locally at each individual client device 104 (e.g., the client device 104C). The client device 104C obtains the training data from the one or more servers 102 or storage 106 and applies the training data to train the data processing models. Subsequently to model training, the client device 104C obtains the content data (e.g., captures video data via an internal camera) and processes the content data using the training data processing models locally. Alternatively, in some embodiments, both model training and data processing are implemented remotely at a server 102 (e.g., the server 102A) associated with a client device 104 (e.g. the client device 104A). The server 102A obtains the training data from itself, another server 102 or the storage 106 and applies the training data to train the data processing models. The client device 104A obtains the content data, sends the content data to the server 102A (e.g., in an application) for data processing using the trained data processing models, receives data processing results from the server 102A, and presents the results on a user interface (e.g., associated with the application). The client device 104A itself implements no or little data processing on the content data prior to sending them to the server 102A. Additionally, in some embodiments, data processing is implemented locally at a client device 104 (e.g., the client device 104B), while model training is implemented remotely at a server 102 (e.g., the server 102B) associated with the client device 104B. The server 102B obtains the training data from itself, another server 102 or the storage 106 and applies the training data to train the data processing models. The trained data processing models are optionally stored in the server 102B or storage 106. The client device 104B imports the trained data processing models from the server 102B or storage 106, processes the content data using the data processing models, and generates data processing results to be presented on a user interface locally.

Figure 2:
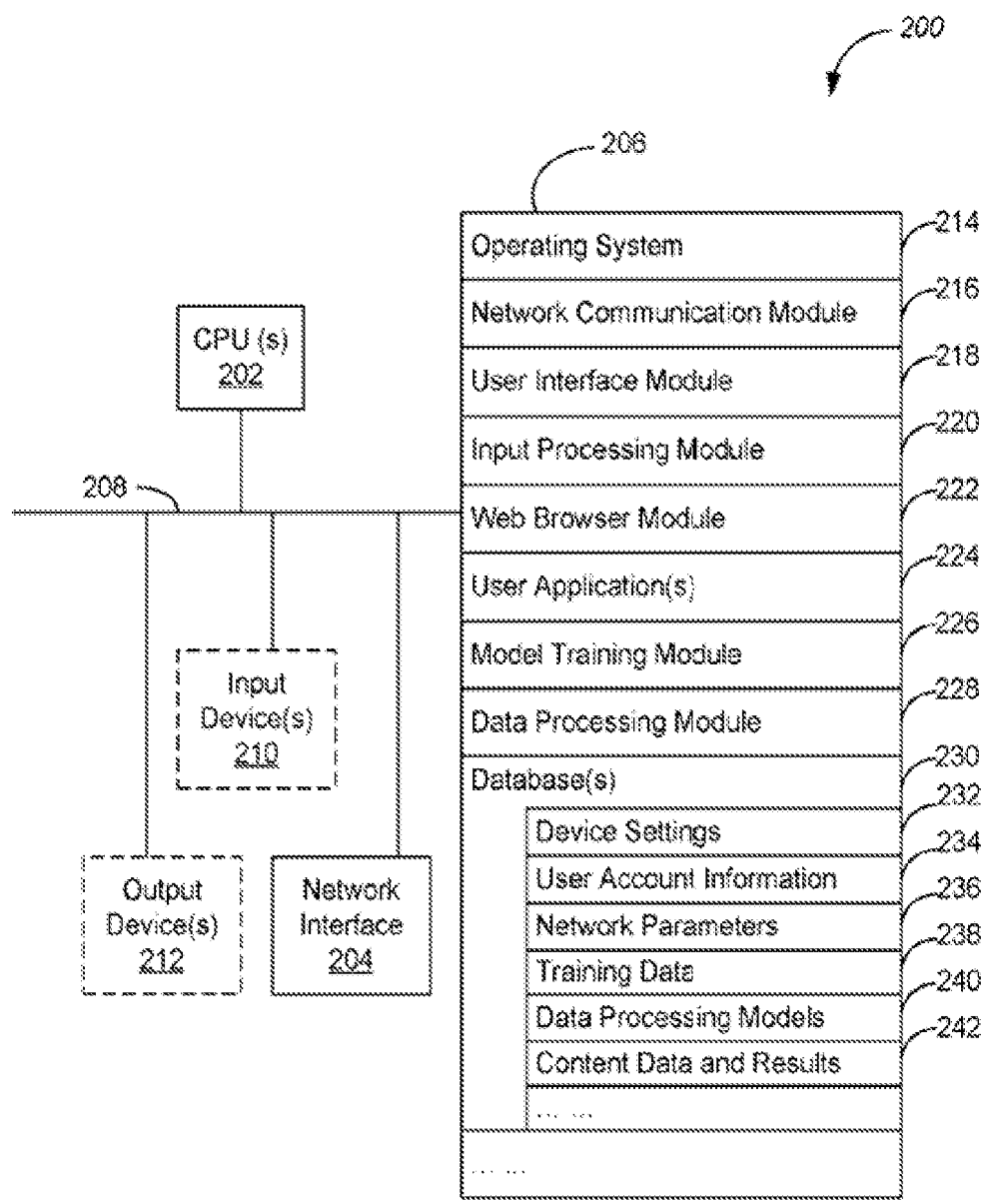
FIG. 2 is a block diagram illustrating a data processing system, in accordance with some embodiments.

FIG. 2 is a block diagram illustrating a data processing system 200, in accordance with some embodiments. The data processing system 200 includes a server 102, a client device 104, a storage 106, or a combination thereof. The data processing system 200, typically, includes one or more processing units (CPUs) 202, one or more network interfaces 204, memory 206, and one or more communication buses 208 for interconnecting these components (sometimes called a chipset). The data processing system 200 includes one or more input devices 210 that facilitate user input, such as a keyboard, a mouse, a voice-command input unit or microphone, a touch screen display, a touch-sensitive input pad, a gesture capturing camera, or other input buttons or controls. Furthermore, in some embodiments, the client device 104 of the data processing system 200 uses a microphone and voice recognition or a camera and gesture recognition to supplement or replace the keyboard. In some embodiments, the client device 104 includes one or more cameras, scanners, or photo sensor units for capturing images, for example, of graphic serial codes printed on the electronic devices. The data processing system 200 also includes one or more output devices 212 that enable presentation of user interfaces and display content, including one or more speakers and/or one or more visual displays. Optionally, the client device 104 includes a location detection device, such as a GPS (global positioning satellite) or other geo-location receiver, for determining the location of the client device 104.

Memory 206 includes high-speed random access memory, such as DRAM, SRAM, DDR RAM, or other random access solid state memory devices; and, optionally, includes non-volatile memory, such as one or more magnetic disk storage devices, one or more optical disk storage devices, one or more flash memory devices, or one or more other non-volatile solid state storage devices. Memory 206, optionally, includes one or more storage devices remotely located from one or more processing units 202. Memory 206, or alternatively the non-volatile memory within memory 206, includes a non-transitory computer readable storage medium. In some embodiments, memory 206, or the non-transitory computer readable storage medium of memory 206, stores the following programs, modules, and data structures, or a subset or superset thereof:

- Operating system 214 including procedures for handling various basic system services and for performing hardware dependent tasks;
- Network communication module 216 for connecting each server 102 or client device 104 to other devices (e.g., server 102, client device 104, or storage 106) via one or more network interfaces 204 (wired or wireless) and one or more communication networks 108, such as the Internet, other wide area networks, local area networks, metropolitan area networks, and so on;
- User interface module 218 for enabling presentation of information (e.g., a graphical user interface for application(s) 224, widgets, websites and web pages thereof, and/or games, audio and/or video content, text, etc.) at each client device 104 via one or more output devices 212 (e.g., displays, speakers, etc.);
- Input processing module 220 for detecting one or more user inputs or interactions from one of the one or more input devices 210 and interpreting the detected input or interaction;
- Web browser module 222 for navigating, requesting (e.g., via HTTP), and displaying websites and web pages thereof, including a web interface for logging into a user account associated with a client device 104 or another electronic device, controlling the client or electronic device if associated with the user account, and editing and reviewing settings and data that are associated with the user account;
- One or more user applications 224 for execution by the data processing system 200 (e.g., games, social network applications, smart home applications, and/or other web or non-web based applications for controlling another electronic device and reviewing data captured by such devices);
- Model training module 226 for receiving training data and establishing a data processing model for processing content data (e.g., video, image, audio, or textual data) to be collected or obtained by a client device 104;
- Data processing module 228 for processing content data using data processing models 240, thereby identifying information contained in the content data, matching the content data with other data, categorizing the content data, or synthesizing related content data, where in some embodiments, the data processing module 228 is associated with one of the user applications 224 to process the content data in response to a user instruction received from the user application 224;
- One or more databases 230 for storing at least data including one or more of:
  - Device settings 232 including common device settings (e.g., service tier, device model, storage capacity, processing capabilities, communication capabilities, etc.) of the one or more servers 102 or client devices 104;
  - User account information 234 for the one or more user applications 224, e.g., user names, security questions, account history data, user preferences, and predefined account settings;
  - Network parameters 236 for the one or more communication networks 108, e.g., IP address, subnet mask, default gateway, DNS server and host name;
  - Training data 238 for training one or more data processing models 240;
  - Data processing model(s) 240 for processing content data (e.g., video, image, audio, or textual data) using deep learning techniques; and
  - Content data and results 242 that are obtained by and outputted to the client device 104 of the data processing system 200, respectively, where the content data is processed by the data processing models 240 locally at the client device 104 or remotely at the server 102 to provide the associated results 242 to be presented on client device 104.

Optionally, the one or more databases 230 are stored in one of the server 102, client device 104, and storage 106 of the data processing system 200. Optionally, the one or more databases 230 are distributed in more than one of the server 102, client device 104, and storage 106 of the data processing system 200. In some embodiments, more than one copy of the above data is stored at distinct devices, e.g., two copies of the data processing models 240 are stored at the server 102 and storage 106, respectively.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, modules or data structures, and thus various subsets of these modules may be combined or otherwise re-arranged in various embodiments. In some embodiments, memory 206, optionally, stores a subset of the modules and data structures identified above.

Furthermore, memory 206, optionally, stores additional modules and data structures not described above.

Figure 3:
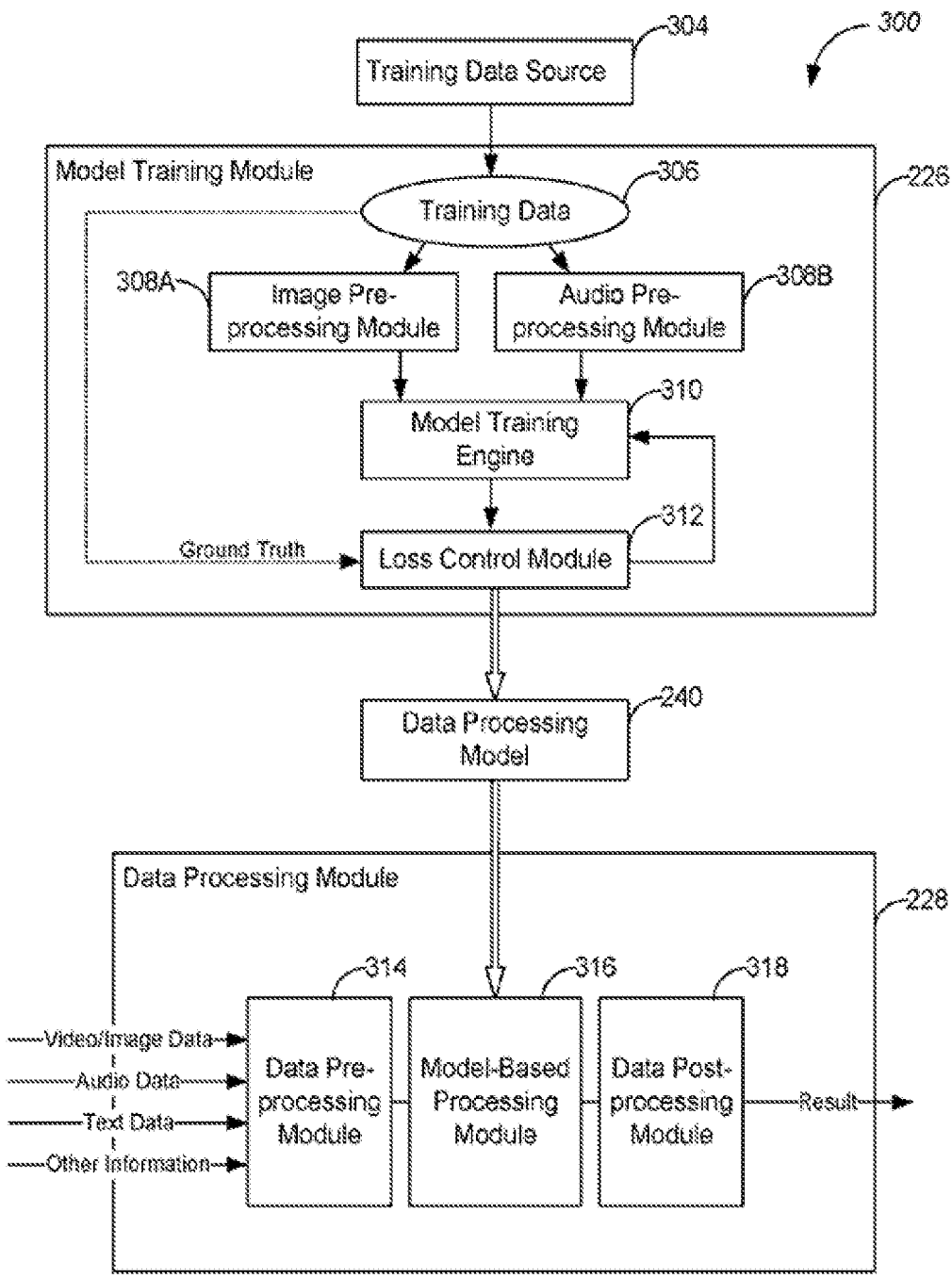
FIG. 3 is an example data processing environment for training and applying a neural network based (NN-based) data processing model for processing visual and/or audio data, in accordance with some embodiments.

FIG. 3 is another example data processing system 300 for training and applying a neural network based (NN-based) data processing model 240 for processing content data (e.g., video, image, audio, or textual data), in accordance with some embodiments. The data processing system 300 includes a model training module 226 for establishing the data processing model 240 and a data processing module 228 for processing the content data using the data processing model 240. In some embodiments, both of the model training module 226 and the data processing module 228 are located on a client device 104 of the data processing system 300, while a training data source 304 distinct form the client device 104 provides training data 306 to the client device 104. The training data source 304 is optionally a server 102 or storage 106. Alternatively, in some embodiments, both of the model training module 226 and the data processing module 228 are located on a server 102 of the data processing system 300. The training data source 304 providing the training data 306 is optionally the server 102 itself, another server 102, or the storage 106. Additionally, in some embodiments, the model training module 226 and the data processing module 228 are separately located on a server 102 and client device 104, and the server 102 provides the trained data processing model 240 to the client device 104.

The model training module 226 includes one or more data pre-processing modules 308, a model training engine 310, and a loss control module 312. The data processing model 240 is trained according to a type of the content data to be processed. The training data 306 is consistent with the type of the content data, so is a data pre-processing module 308 applied to process the training data 306 consistent with the type of the content data. For example, an image pre-processing module 308A is configured to process image training data 306 to a predefined image format, e.g., extract a region of interest (ROI) in each training image, and crop each training image to a predefined image size. Alternatively, an audio pre-processing module 308B is configured to process audio training data 306 to a predefined audio format, e.g., converting each training sequence to a frequency domain using a Fourier transform. The model training engine 310 receives pre-processed training data provided by the data pre-processing modules 308, further processes the pre-processed training data using an existing data processing model 240, and generates an output from each training data item. During this course, the loss control module 312 can monitor a loss function comparing the output associated with the respective training data item and a ground truth of the respective training data item. The model training engine 310 modifies the data processing model 240 to reduce the loss function, until the loss function satisfies a loss criteria (e.g., a comparison result of the loss function is minimized or reduced below a loss threshold). The modified data processing model 240 is provided to the data processing module 228 to process the content data.

In some embodiments, the model training module 226 offers supervised learning in which the training data is entirely labelled and includes a desired output for each training data item (also called the ground truth in some situations). Conversely, in some embodiments, the model training module 226 offers unsupervised learning in which the training data are not labelled. The model training module 226 is configured to identify previously undetected patterns in the training data without pre-existing labels and with no or little human supervision. Additionally, in some embodiments, the model training module 226 offers partially supervised learning in which the training data are partially labelled.

The data processing module 228 includes a data pre-processing modules 314, a model-based processing module 316, and a data post-processing module 318. The data pre-processing modules 314 pre-processes the content data based on the type of the content data. Functions of the data pre-processing modules 314 are consistent with those of the pre-processing modules 308 and covert the content data to a predefined content format that is acceptable by inputs of the model-based processing module 316. Examples of the content data include one or more of: video, image, audio, textual, and other types of data. For example, each image is pre-processed to extract an ROI or cropped to a predefined image size, and an audio clip is pre-processed to convert to a frequency domain using a Fourier transform. In some situations, the content data includes two or more types, e.g., video data and textual data. The model-based processing module 316 applies the trained data processing model 240 provided by the model training module 226 to process the pre-processed content data. The model-based processing module 316 can also monitor an error indicator to determine whether the content data has been properly processed in the data processing model 240. In some embodiments, the processed content data is further processed by the data post-processing module 318 to present the processed content data in a preferred format or to provide other related information that can be derived from the processed content data.

Figure 4A:
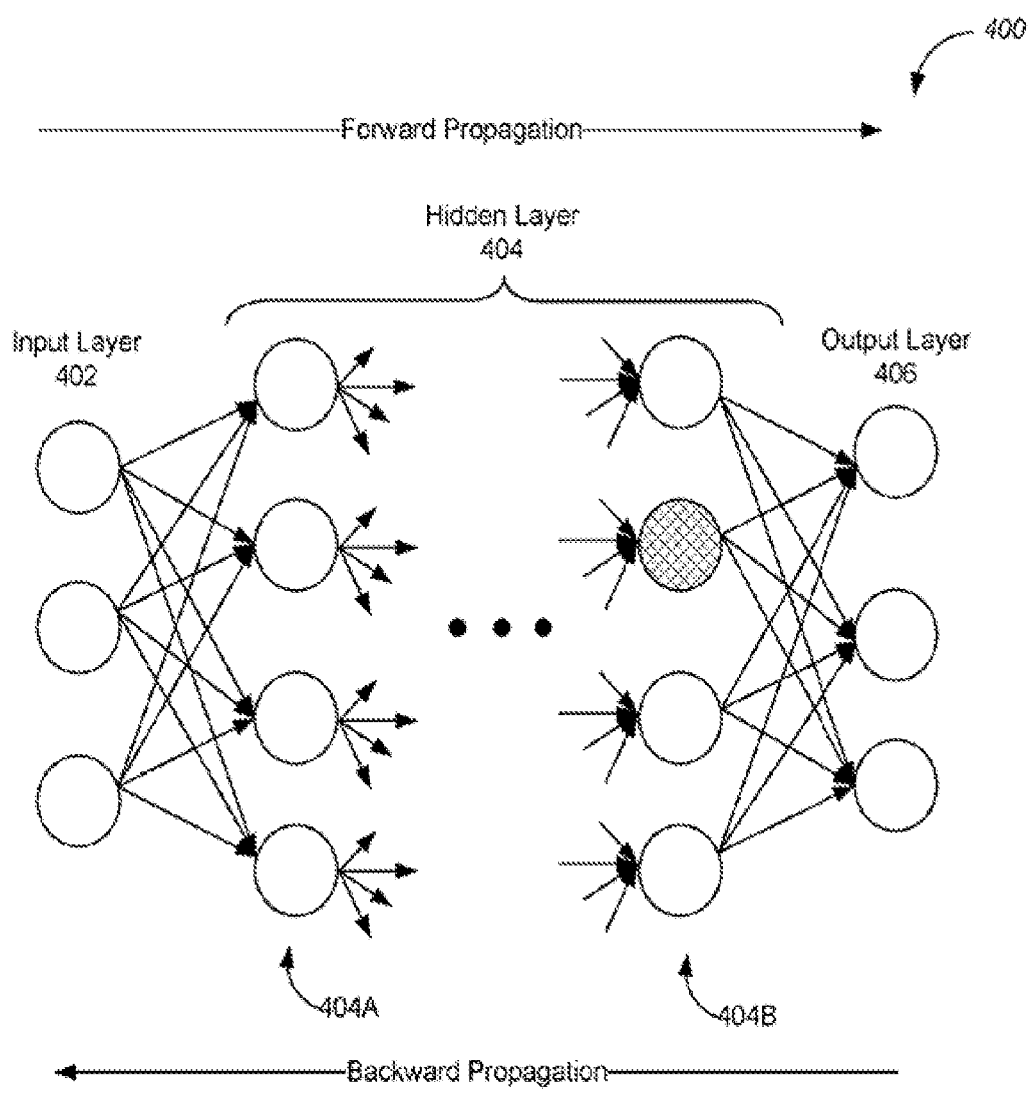
FIG. 4A is an example neural network (NN) applied to process content data in an NN-based data processing model, in accordance with some embodiments.
Figure 4B:
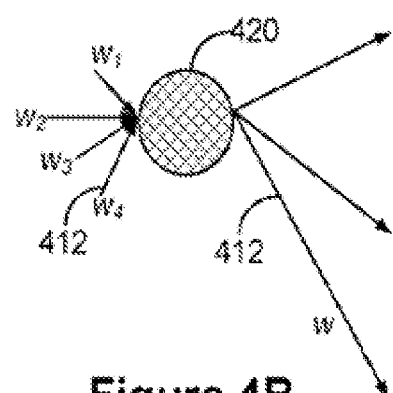
FIG. 4B is an example node in the neural network (NN), in accordance with some embodiments.

FIG. 4A is an example neural network (NN) 400 applied to process content data in an NN-based data processing model 240, in accordance with some embodiments, and FIG. 4B is an example node 420 in the neural network (NN) 400, in accordance with some embodiments. The data processing model 240 is established based on the neural network 400. A corresponding model-based processing module 316 applies the data processing model 240 including the neural network 400 to process content data that has been converted to a predefined content format. The neural network 400 includes a collection of nodes 420 that are connected by links 412. Each node 420 receives one or more node inputs and applies a propagation function to generate a node output from the one or more node inputs. As the node output is provided via one or more links 412 to one or more other nodes 420, a weight w associated with each link 412 is applied to the node output. Likewise, the one or more node inputs are combined based on corresponding weights $w_1$, $w_2$, $w_3$, and $w_4$ according to the propagation function. In an example, the propagation function is a product of a non-linear activation function and a linear weighted combination of the one or more node inputs.

The collection of nodes 420 is organized into one or more layers in the neural network 400. Optionally, the one or more layers includes a single layer acting as both an input layer and an output layer. Optionally, the one or more layers includes an input layer 402 for receiving inputs, an output layer 406 for providing outputs, and zero or more hidden layers 404 (e.g., 404A and 404B) between the input and output layers 402 and 406. A deep neural network has more than one hidden layers 404 between the input and output layers 402 and 406. In the neural network 400, each layer is only connected with its immediately preceding and/or immediately following layer. In some embodiments, a layer 402 or 404B is a fully connected layer because each node 420 in the layer 402 or 404B is connected to every node 420 in its immediately following layer. In some embodiments, one of the one or more hidden layers 404 includes two or more nodes that are connected to the same node in its immediately following layer for down sampling or pooling the nodes 420 between these two layers. Particularly, max pooling uses a maximum value of the two or more nodes in the layer 404B for generating the node of the immediately following layer 406 connected to the two or more nodes.

In some embodiments, a convolutional neural network (CNN) is applied in a data processing model 240 to process content data (particularly, video and image data). The CNN employs convolution operations and belongs to a class of deep neural networks 400, i.e., a feedforward neural network that only moves data forward from the input layer 402 through the hidden layers to the output layer 406. The one or more hidden layers of the CNN are convolutional layers convolving with a multiplication or dot product. Each node in a convolutional layer receives inputs from a receptive area associated with a previous layer (e.g., five nodes), and the receptive area is smaller than the entire previous layer and may vary based on a location of the convolution layer in the convolutional neural network. Video or image data is pre-processed to a predefined video/image format corresponding to the inputs of the CNN. The pre-processed video or image data is abstracted by each layer of the CNN to a respective feature map. By these means, video and image data can be processed by the CNN for video and image recognition, classification, analysis, imprinting, or synthesis.

Alternatively and additionally, in some embodiments, a recurrent neural network (RNN) is applied in the data processing model 240 to process content data (particularly, textual and audio data). Nodes in successive layers of the RNN follow a temporal sequence, such that the RNN exhibits a temporal dynamic behavior. In an example, each node 420 of the RNN has a time-varying real-valued activation. Examples of the RNN include, but are not limited to, a long short-term memory (LSTM) network, a fully recurrent network, an Elman network, a Jordan network, a Hopfield network, a bidirectional associative memory (BAM network), an echo state network, an independently RNN (IndRNN), a recursive neural network, and a neural history compressor. In some embodiments, the RNN can be used for handwriting or speech recognition. It is noted that in some embodiments, two or more types of content data are processed by the data processing module 228, and two or more types of neural networks (e.g., both CNN and RNN) are applied to process the content data jointly.

The training process is a process for calibrating all of the weights $w_i$ for each layer of the learning model using a training data set which is provided in the input layer 402. The training process typically includes two steps, forward propagation and backward propagation, which are repeated multiple times until a predefined convergence condition is satisfied. In the forward propagation, the set of weights for different layers are applied to the input data and intermediate results from the previous layers. In the backward propagation, a margin of error of the output (e.g., a loss function) is measured, and the weights are adjusted accordingly to decrease the error. The activation function is optionally linear, rectified linear unit, sigmoid, hyperbolic tangent, or of other types. In some embodiments, a network bias term b is added to the sum of the weighted outputs from the previous layer before the activation function is applied. The network bias b provides a perturbation that helps the NN 400 avoid over fitting the training data. The result of the training includes the network bias parameter b for each layer.

Figure 5:
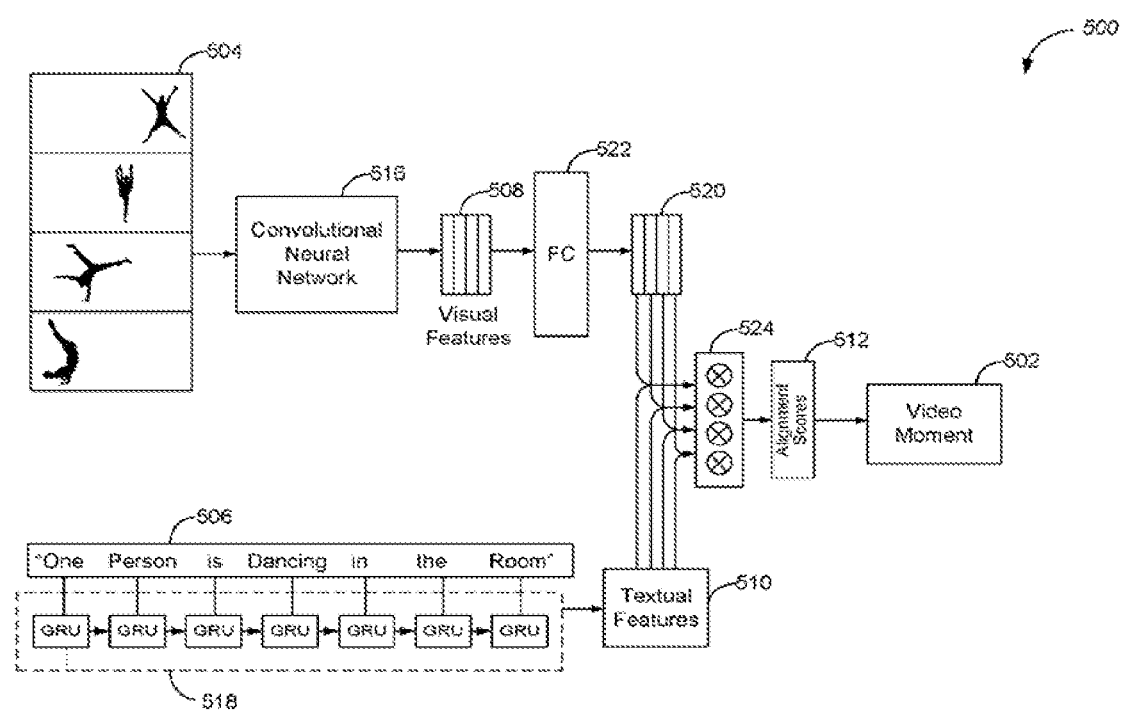
FIG. 5 illustrates a process in which a video moment is retrieved from video content based on text description of the video moment, in accordance with some embodiments.

FIG. 5 illustrates a process 500 in which a video moment 502 is retrieved from video content 504 based on text description 506 of the video moment 502, in accordance with some embodiments. The process 500 is implemented by a computer system (e.g., a client device 104, a server 102, or a combination thereof). The computer system obtains the video content 504 including the video moment 502 and the text description 506 describing content of the video moment 502. For example, the video content 504 is one or more video clips captured by a camera of the computer system or a movie downloaded from a server. An example of the text description 506 is "one person is dancing in the room." The video content 504 is divided into a plurality of video segments. The text description 506 includes one or more sentences. A visual feature 508 is extracted for each video segment of the video content 504, and optionally includes a plurality of visual feature elements organized into a vector or matrix. A textual feature 510 is extracted for each sentence in the text description 506, and optionally includes a plurality of visual feature elements organized into a vector or matrix. Visual features 508 of the plurality of video segments and textual features 510 of the one or more sentences are combined to generate a plurality of alignment scores 512. For each sentence, the computer system identifies one or more respective segments having the highest alignment scores. As a result, a subset of the video content 504, i.e., the video moment 502, is retrieved for the text description 506 including the one or more sentences based on the plurality of alignment scores 512.

In some embodiments, the text description 506 includes one or more sentences that jointly describe the video moment 502 in the video content 504, and the video moment 502 needs to be trimmed out of the video content 504 as a result of implementing the process 500. A visual feature 508 can be generated from a pre-trained convolutional neural network 516 for each video segment of the video content 504. For example, each video segment includes a predefined number of consecutive image frames of the video content 504 (e.g., 16 image frames), and the convolutional neural network 516 includes a C3D model (e.g., pre-trained on Kinetics-400) applied to extract the visual feature 508 of each video segment. Further, a textual feature 510 can be extracted by a text decoder 518 (e.g., including a Recurrent Neural Network) for each sentence of the text description 506. Specifically, in some implementations, each word in a sentence is mapped to an embedding space using GloVe word representation and processed by Gated Recurrent Units (GRU) for encoding the corresponding sentence. The text decoder 518 decodes each sentence based on individual words and generates a sentence-wise textual feature 510, $t=\{w^1, \ldots, w^M\}$, where M is the number of words in the respective sentence.

When the visual features 508 of the plurality of video segments and the textual features 510 of the one or more sentences are combined to generate a plurality of alignment scores 512, the alignment scores 512 represent relevance between the plurality of video segments of the video content 504 and the one or more sentences of the text description 506. In an example, each of the alignment scores 512 is determined based on a cosine similarity. The cosine similarity is higher for a temporally related pair of video segment and sentence, and lower for a temporally irrelevant pair of video segment and sentence.

The visual features 508 of the video content 504 and the textual features 510 of the text description 506 are represented as $\{v_j\}_{j=1}^{N_v}$ and $\{t_k\}_{k=1}^{N_w}$, respectively. $N_v$ denotes a number of video segments in the video content 504, and $N_v$ denotes a number of sentences in the corresponding text description 506. The visual feature 508 of the $j^{th}$ segment of the video content 504 is represented by $v_j$. The textual feature 510 of the $k^{th}$ sentence in the text description 506 is represented $t_k$. In some embodiments, the visual feature 508 ($v_j$) is transformed to another visual feature 520 ($\tilde{v}_j$) having the same dimension as textual feature through two consecutive fully-connected layers 522. In some embodiments, the cosine similarity $c_{j,k}$ between the $j^{th}$ video segment and the $k^{th}$ sentence is calculated (524) as follows:

$$c_{j,k} = \frac{t_k^T \cdot \tilde{v}_j}{\|t_k\|_2 \cdot \|\tilde{v}_j\|_2} \quad (1)$$

A plurality of cosine similarities are derived between the visual features 520 of the video content 504 and the textual features 510 of the text description 506. For example, a softmax operation is applied to each cosine similarity $c_{j,k}$ in a temporal domain to obtain a corresponding alignment score 512 ($S_{j,k}$) as follows:

$$s_{j,k} = \frac{\exp(c_{j,k})}{\sum_{j=1}^{N_v} \exp(c_{j,k})} \quad (2)$$

Such alignment scores 512 ($S_{j,k}$) are configured to highlight one or more video segments of the video content 504 that are associated with the $k^{th}$ sentence in the text description 506. For each sentence, one or more respective video segments having highest alignment scores 512 are identified to be associated with the respective sentence. As such, a subset of the video segments in the video content 504 (i.e., the video moment 502) can be retrieved for the text description 506 made of the one or more sentences based on the alignment scores 512.

Figure 6:
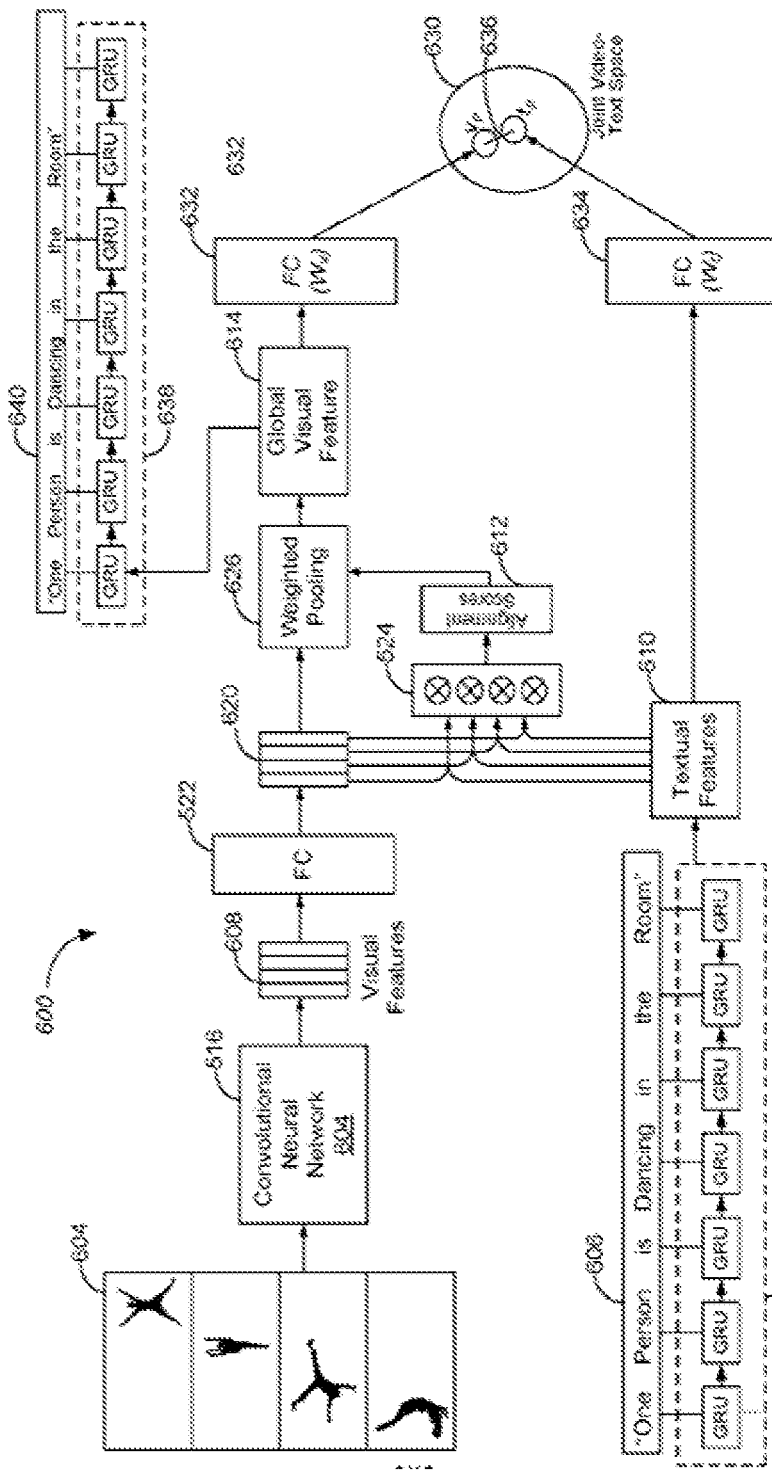
FIG. 6 illustrates a training process that determines deep learning models used in a video retrieval process shown in FIG. 5, in accordance with some embodiments.

FIG. 6 illustrates a training process 600 that determines deep learning models used in a video retrieval process shown in FIG. 5, in accordance with some embodiments. A training data set is applied to train a corresponding deep learning model (e.g., including the convolutional neural network 516 and recurrent neural network in the text decoder 518). The training data set includes a plurality of video training content items 604 and corresponding training text description 606, and is represented as D={{$v_j^i$}$_{j=1}^{N_v^i}$, {$t_k^i$}$_{k=1}^{N_w^i}$}$_{i=1}^{N}$, where N is a number of video training content items 604 in the training data set; $N_v^i$ and $N_w^i$ denote a number of video segments and a number of sentences for the $i^{th}$ video training content item 604-$i$ and corresponding $i^{th}$ training text description 606-$i$, respectively; $v_j^i$ is the training visual feature 608 of a $j^{th}$ segment of the $i^{th}$ video training content item 604-$i$; and $t_k^i$ is the training textual feature 610 of a $k^{th}$ sentence associated with the $i^{th}$ training text description 606-$i$ corresponding to the $i^{th}$ video training content item 604-$i$.

In some embodiments, the training visual feature 608 ($v_j^i$) is transformed to another training visual feature 620 ($\tilde{v}_j^i$) having the same dimension as the training textual features 610 through two consecutive fully-connected layers 522. A cosine similarity $c_{j,k}^i$ between the $j^{th}$ video segment of the $i^{th}$ video training content item 604-$i$ and the $k^{th}$ sentence of the corresponding $i^{th}$ training text description 606-$i$ is calculated (624) as follows:

$$c_{j,k}^i = \frac{t_k^{iT} \cdot \tilde{v}_j^i}{\|t_k^i\|_2 \cdot \|\tilde{v}_j^i\|_2} \quad (3)$$

A plurality of cosine similarities are derived between the visual features 620 of the $i^{th}$ video training content item 604-$i$ and the textual features 610 of the corresponding training text description 606-$i$. For example, a softmax operation is applied to each cosine similarity $c_{j,k}^i$ in the temporal domain to obtain the corresponding alignment score 612 ($s_{j,k}^i$) as follows:

$$s_{j,k}^i = \frac{\exp(c_{j,k}^i)}{\sum_{j=1}^{N_v^i} \exp(c_{j,k}^i)} \quad (4)$$

Such an alignment score 612 ($s_{j,k}^i$) is configured to highlight a subset of video segments of the $i^{th}$ video training content item 604-$i$ that are associated with the $k^{th}$ sentence in the training text description 606-$i$. Thus, the alignment scores 612 are applied to pool (626) the training visual features 620 in a weighted manner and provide the text-dependent global training visual feature 614 for the given text description 606-$i$ as follows:

$$g_k^i = \sum_{j=1}^{N_v^i} s_{j,k}^i \cdot \tilde{v}_j^i \quad (5)$$

The global training visual feature 614 and the corresponding training textual features 610 are projected to a joint video-text space 630 based on a feature projection model (e.g., including fully-connected layers 632 and 634). Prior to this projection operation, the training visual features 620 ($\tilde{v}_j^i$) are extracted based on a visual feature extraction model (e.g., including the convolutional neural network 504 and fully-connected layers 522), and the training textual features 610 ($t_k^i$) are extracted based on a textual feature extraction model (e.g., including a Recurrent Neural Network of the text decoder 518). The visual feature extraction model, textual feature extraction model, and feature projection model are trained jointly by minimizing a loss function L that is based on a distance 636 between the global training visual feature 614 and the corresponding training textual features 610 in the joint video-text space 630. By these means, the training process 600 implicitly enforces these models to learn how to determine a relevance between video segments in a video content item and text description.

Under some circumstances, the loss function L that is based on the distance 636 focuses on the most discriminative but small regions, rather than covering the complete relevant part of the corresponding video content item. A text decoder 638 is incorporated to the textual feature extraction model to reconstruct text description 640 from the global training visual feature 614. In an example, the text decoder 638 is parameterized by a plurality of GRUs. A goal of the training process 600 is to teach the visual feature extraction, textual feature extraction, and feature projection models to preserve as much visual information relevant to corresponding textual description as possible in the global training visual feature 614, so that these models consider more relevant regions including some less discriminative regions.

In some embodiments, a loss function L includes three components including a triplet ranking loss $L_{triplet}$, a reconstruction loss $L_{rec}$, and a maximum mean discrepancy (MMD) loss $L_{MMD}$. The triplet ranking loss $L_{triplet}$ ensures video and text embeddings that are matched are closer than non-matching pairs. Video embedding is denoted as $v_p = W_v \cdot g$, and text embedding is denoted as $t_p = W_t \cdot t$, wherein notations i, j, k are dropped for simplicity, and $W_v$ and $W_t$ represent the fully-connected layers 632 and 634 that project the global training visual and textual features 614 and 610 to the joint video-text space 630, respectively. The triplet ranking loss $L_{triplet}$ is defined as follows:

$$L_{triplet} = \Sigma_{\{v_p, t_p\}} \{\Sigma_{t_p^-} \max[0, \Delta - s(v_p, t_p^-) + s(v_p, t_p^-)] + \Sigma_{p_g^-} \max[0, \Delta - s(t_p, v_p) + s(t_p, v_p^-)]\} \quad (6)$$

where $t_p$ and $t_p^-$ represent a matching and a non-matching text embedding for video embedding $v_p$, respectively; $v_p$, $v_p^-$ represent a matching and a non-matching video embedding for text embedding $t_p$; $\Delta$ is the margin value for ranking; and $s(\bullet,\bullet)$ is a scoring function that measures the similarity between two embeddings. In an example, the scoring function is configured to determine a cosine similarity between video and textual features.

The reconstruction loss $L_{rec}$ is calculated for the reconstructed text description 640 and the original training text description 604 as follows:

$$L_{rec} = -\sum_{t'=1}^{T'} \log P(y_{t'} \mid y_1, \ldots, y_{t'-1}, g) \quad (7)$$

where $y_{t'}$ denotes a prediction of the t'-th sentence of the text description 604, and g is the global training visual feature 614.

A Maximum Mean Discrepancy (MMD) criterion is adopted in the training process 600 to promote an alignment between video segments and sentences in a common space. The MMD criterion is viewed as a two-sample test between a distribution of visual features of the video segments and textual features of the text description 606 in the joint video-text space 630. As such, the MMD loss $L_{MMD}$ is defined as follows:

$$L_{MMD} = \|E_{d_v}[\xi(v_p)] - E_{d_t}[\xi(t_p)]\|^2_{\mathcal{H}_k} \quad (8)$$

where $d_v$ and $d_t$ are distributions of the video and sentence embeddings, respectively, $\xi$ is a feature map defined through a kernel k (e.g., a Gaussian kernel), and $\mathcal{H}_k$ is a reproducing kernel (e.g., a Hilbert space of k).

The loss function L is a weighted combination of the triplet ranking loss $L_{triplet}$, reconstruction loss $L_{rec}$, and MMD loss $L_{MMD}$ as follows:

$$L = L_{triplet} + \alpha \cdot L_{rec} + \beta \cdot L_{MMD} \quad (9)$$

where $\alpha$ and $\beta$ are weighting factors. In some embodiments, the loss function L is minimized by back propagation through a Stochastic Gradient Descent process.

Figure 7A:
FIGS. 7A and 7B are two example video moments retrieved from video content based on text description, in accordance with some embodiments.
Figure 7B:
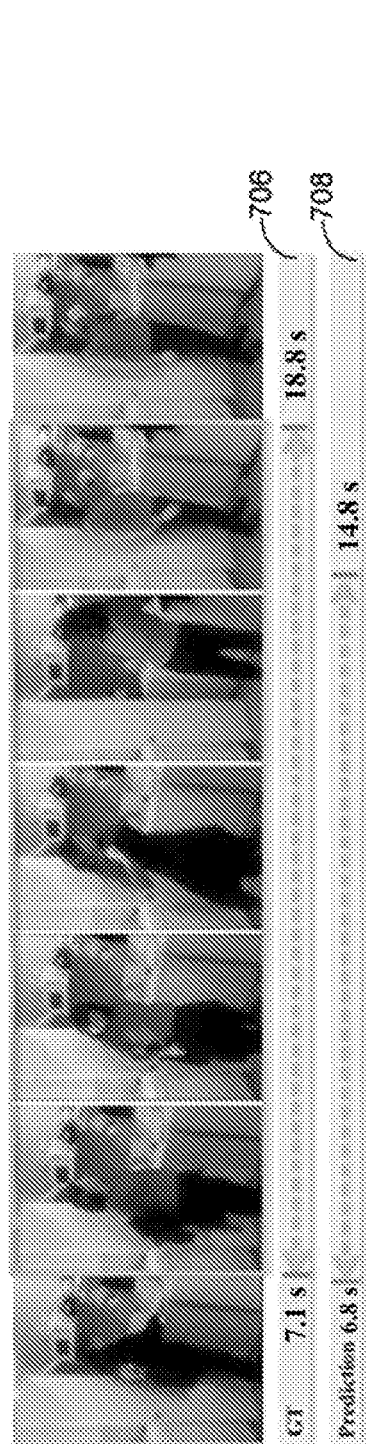

FIGS. 7A and 7B are two example video moments 700 and 750 retrieved from video content based on text description, in accordance with some embodiments. A visual feature extraction model, a textual feature extraction model, and a feature projection model are trained using the Charades-STA* dataset, which includes 12,408 text description-moment pairs for training and 3,720 text description items for testing. On average, a length of each text description is 8.6 words and a length of each video moment is 29.8 seconds. Referring to FIG. 7A, training text description is "a person takes off a jacket." A ground truth moment 702 covers 24.1-31.0 seconds, while a subset of the training video content item (i.e., a predicted video moment 704) extracted by the process 600 covers 23.5-28.0 seconds. A length of the predicted video moment 704 is shorter than that of the ground truth moment 702, while 86.7% of the predicted video moment 704 overlaps the ground truth moment 702. Referring to FIG. 7B, training text description is "a person closes a door." A ground truth moment 706 covers 7.1-18.8 seconds, while a subset of the training video content item (i.e., a predicted video moment 708) extracted by the process 600 covers 6.8-14.8 seconds. A length of the predicted video moment 708 is shorter than that of the ground truth moment 706, while 96.3% of the predicted video moment 708 overlaps the ground truth moment 706.

Rank-based performance metrics are applied. For example, a percentage of at least one of the top-K retrieved video moments is monitored for having an Intersection of Union (IoU) to a ground-truth moment that is larger than a threshold m. In some embodiments, a sliding window of 128 and 256 image frames to obtain candidate video moments. The candidate video moments are ranked according to their alignment scores 612.

TABLE 1

Performance evaluation results for the Charades-STA dataset
($K \in \{1, 5, 10\}$, $m \in \{0.3, 0.5, 0.7\}$)

| | IoU = 0.3 | | | IoU = 0.5 | | | IoU = 0.7 | | |
|---|---|---|---|---|---|---|---|---|---|
| Method | R @ 1 | R @ 5 | R @ 10 | R @ 1 | R @ 5 | R @ 10 | R @ 1 | R @ 5 | R @ 10 |
| Proposed | 32.04 | 84.57 | 98.89 | 18.20 | 60.50 | 85.21 | 8.04 | 27.45 | 48.38 |

Referring to Table 1, in some embodiments, the computer system determines a first percentage of the top one retrieved video moments having a first intersection over union (IOU) to respective ground-truth moments that is larger than 0.3. The first percentage is greater than 30% based on the processes 500 and 600. The computer system also determines a second percentage of at least one of top 5 retrieved video moments having the first IOU to the respective ground-truth moments (i.e., the first IOU>0.3). The second percentage increases to be greater than 80%. The computer system also determines a third percentage of at least one of top 10 retrieved video moments having the first IOU to the respective ground-truth moments (i.e., the first IOU>0.3). The third percentage increases to be greater than 95%. Alternatively, in some embodiments, the computer system determines a first percentage of the top one retrieved video moments having a second IOU to respective ground-truth moments that is larger than 0.5. The first percentage is greater than 15% for the processes 500 and 600. The computer system also determines a second percentage of at least one of top 5 retrieved video moments having the second IOU to the respective ground-truth moments (i.e., the second IOU>0.5). The second percentage increases to be greater than 55%. The computer system also determines a third percentage of at least one of top 10 retrieved video moments having the second IOU to the respective ground-truth moments (i.e., the second IOU>0.5). The third percentage increases to be greater than 80%. Additionally and alternatively, in some embodiments, the computer system determines a first percentage of the top one retrieved video moments having a third IOU to respective ground-truth moments that is larger than 0.7. The first percentage is greater than 5% for the processes 500 and 600. The computer system also determines a second percentage of at least one of top 5 retrieved video moments having the third IOU to the respective ground-truth moments (i.e., the third IOU>0.7). The second percentage increases to be greater than 25%. The computer system also determines a third percentage of at least one of top 10 retrieved video moments having the third IOU to the respective ground-truth moments (i.e., the third IOU>0.7). The third percentage increases to be greater than 45%. As such, the process 500 significantly outperforms a random method that randomly selects a video moment for a text query, and performs comparably to a state-of-the-art fully-supervised method (CTRL), thereby confirming that the process 500 has managed to align text description and the video moment effectively without annotating temporal boundaries.

In some embodiments, an algorithm applied in the 500 and 600 is simplified to create different ablation models. Referring to Table 2, large performance degradation (e.g., from 8.04 to 6.76 for R@ 1, IoU=0.7) is observed when the reconstruction loss $L_{rec}$ is removed from the loss function L. Also, performance degradation is consistently observed when the MMD loss $L_{MMD}$ is removed from the loss function L. Such observations confirm the effectiveness of text reconstruction and MMD mechanisms in the processes 500 and 600.

operations in method 800 may be combined and/or the order of some operations may be changed.

The computer system obtains (802) video content 504 and text description 506 associated with a video moment 502. The video content 504 includes a plurality of video segments, and the text description 506 includes one or more sentences. The computer system extracts (804) a plurality of visual features 520 for the video segments of the video content 504, e.g., extracts a plurality of visual features 508 that are converted to the visual features 520. The computer system extracts (806) one or more textual features 510 for the one or more sentences in the text description 506. The visual features 520 of the plurality of video segments and the textual features 510 of the one or more sentences are combined (808) to generate a plurality of alignment scores 512. The computer system retrieves (810) a subset of the video content (i.e., the video moment 502) for the text description 506 from the video segments based on the plurality of alignment scores.

In some embodiments, the visual features 520 and textual features 510 are extracted based on a visual feature extraction model and a textual feature extraction model, respectively. Prior to obtaining the video content 504 and text description 506, the computer system trains the visual feature extraction model, the textual feature extraction model, and a feature projection model using training data based on a loss function L. The training data includes a first set of video training content items 604 and a second set of training text description items 606 associated with the first set of video training content items 604. For each vide training

TABLE 2

Performance comparison of various loss settings

| Method | IoU = 0.3 | | | IoU = 0.5 | | | IoU = 0.7 | | |
|---|---|---|---|---|---|---|---|---|---|
| | R @ 1 | R @ 5 | R @ 10 | R @ 1 | R @ 5 | R @ 10 | R @ 1 | R @ 5 | R @ 10 |
| Proposed without $L_{rec}$ | 30.80 | 82.23 | 98.01 | 16.67 | 59.34 | 84.23 | 6.76 | 26.50 | 47.30 |
| Proposed without $L_{MMD}$ | 31.17 | 83.76 | 98.77 | 17.98 | 59.48 | 85.10 | 7.80 | 26.86 | 47.69 |
| Proposed full | 32.04 | 84.57 | 98.89 | 18.20 | 60.50 | 85.21 | 8.04 | 27.45 | 48.38 |

Figure 8:
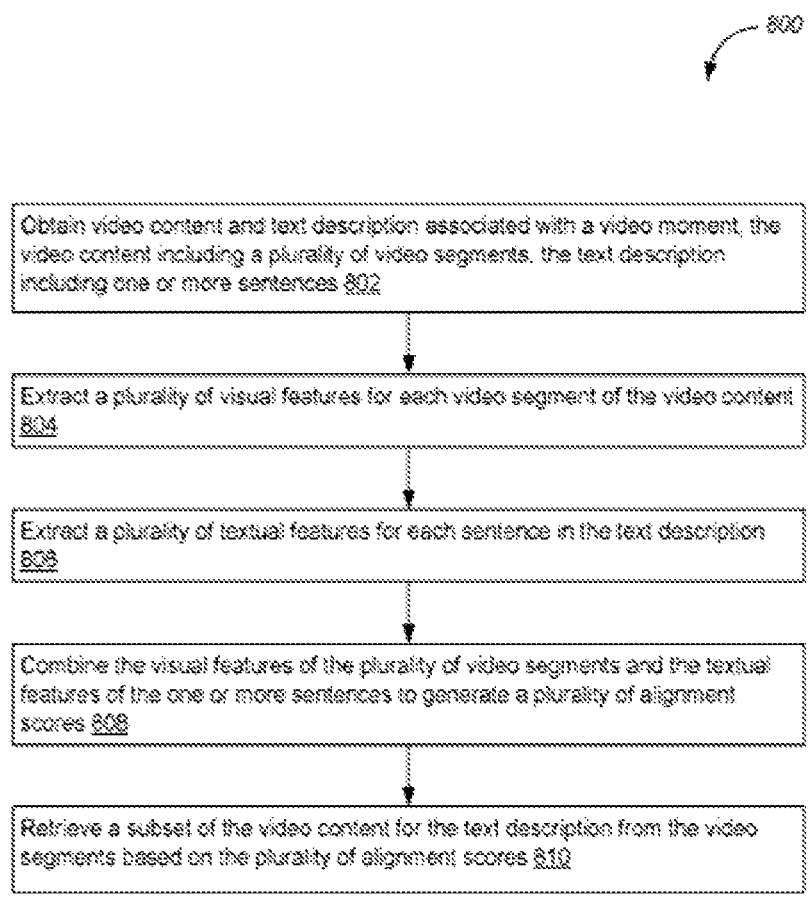
FIG. 8 is a flowchart of a video retrieval method, in accordance with some embodiments.

FIG. 8 is a flowchart of a video retrieval method 800, in accordance with some embodiments. For convenience, the method 800 is described as being implemented by a computer system (e.g., a client device 104, a server 102, or a combination thereof). An example of the client device 104 is a mobile phone. In an example, the method 800 is applied to identify a video moment 502 from video content 504 based on text description 506, and the video content 504 is captured by a surveillance camera and streamed to a server 102. Method 800 is, optionally, governed by instructions that are stored in a non-transitory computer readable storage medium and that are executed by one or more processors of the computer system. Each of the operations shown in FIG. 8 may correspond to instructions stored in a computer memory or non-transitory computer readable storage medium (e.g., memory 206 of the system 200 in FIG. 2). The computer readable storage medium may include a magnetic or optical disk storage device, solid state storage devices such as Flash memory, or other non-volatile memory device or devices. The instructions stored on the computer readable storage medium may include one or more of: source code, assembly language code, object code, or other instruction format that is interpreted by one or more processors. Some content item 604, the computer system generates a corresponding global training visual feature 614 and training textual features 610 of an associated training text description item 606 corresponding to the respective video training content item 604, and projects the global training visual feature 614 and the corresponding training textual features 610 to a joint video-text space 630 based on the feature projection model. Further, in some embodiments, for each video training content item 604, the computer system determines a distance 636 of the corresponding global training visual feature 614 and the training textual features 610 of the associated training text description item 606 in the joint video-text space 630, and adjusts the visual feature extraction model, the textual feature extraction model, and the feature projection model to minimize the distance 636.

In some embodiments, for each video training content item 604, the computer system reconstructs the training text description item 640 based on the corresponding global training visual feature 614, and adjusting the visual feature extraction model, the textual feature extraction model, and the feature projection model to minimize the loss function L. The loss function L is a weighted combination of a triplet ranking loss $L_{triplet}$, a reconstruction loss $L_{rec}$, and a maximum mean discrepancy (MMD) loss $L_{MMD}$. Further, in some embodiments, the loss function L is minimized by back propagation through a Stochastic gradient descent process.

In some embodiments, the plurality of visual features 520 are extracted for the video segments of the video content using a convolutional neural network 516. Further, in some embodiments, each video segment includes a predefined number of consecutive image frames (e.g., 16 frames), and the convolutional neural network 516 includes a C3D model.

In some embodiments, a respective textual feature 510 is extracted for each sentence based a recurrent neural network in a text decoder 518. Further, in some embodiments, the textual features 510 are extracted for the text description 506 by implementing the following operations for each sentence: mapping each word in the respective sentence to an embedding space using GloVe word representation and encoding the respective sentence using GRUs.

In some embodiments, the visual features 520 of the plurality of video segments and the textual features 510 of the one or more sentences are combined to generate the plurality of alignment scores 512. Specifically, for each video segment, the computer system generates (524) a similarity between the respective video segment and each sentence in the text description 506, e.g., using the visual feature 520 of each video segment and the textual feature 510 of each sentence, and applies a softmax operation to the similarity in a temporal domain to obtain a respective one of the alignment scores 512 for each sentence in the text description 606. The respective one of the alignment scores 512 indicates a correlation level between the respective video segment and each sentence in the text description 506.

In some embodiments, the text description 506 is closely associated with the subset of the video content, i.e., the video moment 502, and loosely associated with the video content 504. For example, the text description 506 describes 90% of the subset of the video content, and however, only describes less than 40% of the entire video content 504. Alternatively and specifically, in some embodiments, the video content 504 is not trimmed and corresponds to a first duration of time, and the text description 506 corresponds to a second duration of time that is equal to or less than the first duration of time. The subset of video content corresponds to a third duration of time that is substantially equal to the second duration of time, i.e., a difference between the second and third durations of time is less than a threshold percentage (such as 5%) of each other.

In some embodiments, the computer system includes a user application 224 configured to display a user interface for receiving the text description 506 and presenting the video moment 502 with reference to the video content 504. In an example, the video content 504 is captured by a surveillance camera and streamed to a server 102. The method 800 is implemented at the server 102 to identify the video moment 502. The user interface is enabled on a mobile device of a user for receiving the text description 506 and presenting the video moment 502 with reference to the video content 504.

It should be understood that the particular order in which the operations in FIG. 8 have been described are merely exemplary and are not intended to indicate that the described order is the only order in which the operations could be performed. One of ordinary skill in the art would recognize various ways to identify human poses as described herein. Additionally, it should be noted that details of other processes described above with respect to FIGS. 5-7 are also applicable in an analogous manner to method 800 described above with respect to FIG. 8. For brevity, these details are not repeated here.

Figure 9:
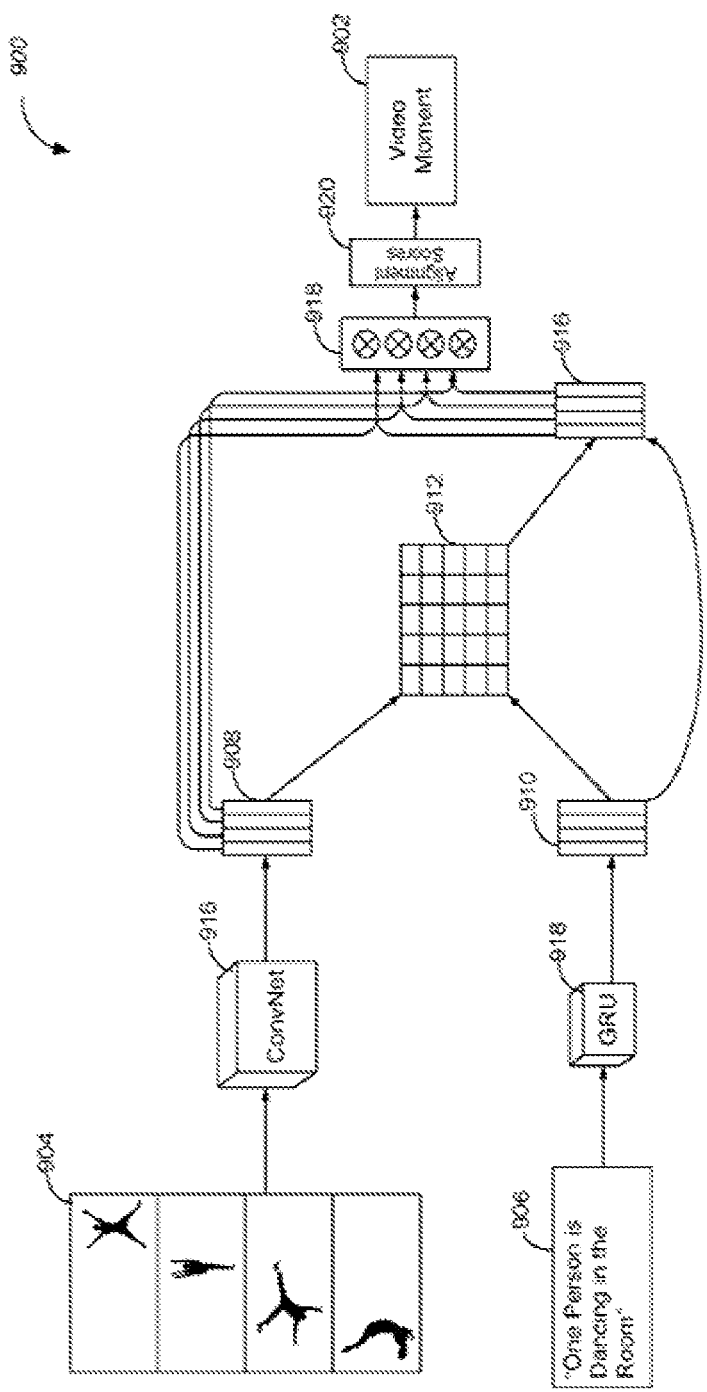
FIG. 9 illustrates a process that retrieves a video moment from video content based on a textual query regarding the video moment, in accordance with some embodiments.

FIG. 9 illustrates a process 900 that retrieves a video moment 902 from video content 904 based on a textual query 906 regarding the video moment 902, in accordance with some embodiments. The process 900 is implemented by a computer system (e.g., a client device 104, a server 102, or a combination thereof). The computer system obtains video content 904 and a textual query 906 describing content of the video moment 902. For example, the video content 504 is one or more video clips captured by a camera of the computer system or a movie downloaded from a server. An example of the textual query 906 is "one person dancing in the room." The video content 904 includes a plurality of video segments, and the textual query 906 includes one or more words that optionally form one or more phrases or sentences. A visual feature 908 is extracted for each video segment of the video content 904, and optionally includes a plurality of visual feature elements organized into a vector or matrix. A textual feature 910 is extracted for each word in the textual query, and optionally includes a plurality of visual feature elements organized into a vector or matrix. In some embodiments, the textual features 910 of words in each sentence are grouped to a sentence-based textual feature. Visual features 908 of the plurality of video segments and textual features 910 of the one or more words are combined to generate a similarity matrix 912. Each element of the similarity matrix 912 represents a similarity level between a respective one of the video segments and a respective one of the words. The computer system generates a sentence-attended video feature 920 for the video segments based on the visual features 908 of the plurality of video segments and the similarity matrix 912. As a result, a subset of the video content 904 associated with the textual query 906, i.e., the video moment 902, is extracted from the video segments based on the sentence-attended video feature 920 of the video segments.

The textual query 906 includes one or more words that jointly describe the video moment 902 in the video content 904, and the video moment 902 needs to be trimmed out of the video content 904 as a result of implementing the process 900. The process 900 is configured to fully exploit a fine-grained relevance between words and video segments via a cross attention mechanism. Specifically, in some embodiments, a plurality of visual features 908 can be generated from a pre-trained convolutional neural network (ConvNet) 916 for the video segments of the video content 904. For example, each video segment includes a predefined number of consecutive image frames of the video content 904 (e.g., 16 image frames), and the convolutional neural network 916 includes a C3D model (e.g., pre-trained on Kinetics-400). Further, a textual feature 910 can be extracted by a text decoder 918 (e.g., including a Recurrent Neural Network) for each word of the textual query 906. For sentence encoding, each word is mapped to an embedding space using GloVe word embedding. Each word is then encoded by a GRU into a sentence-based textual feature $t=\{w^1, \ldots, w^M\}$, where M is the number of words in the sentence.

While the process 500 focuses on learning interaction between video segments and sentences, the process 900 operates in a finer granularity and explicitly associates each word in the textual query 906 with each video segment in the video content 904. Specifically, the video content 904 and corresponding textual query 906 are represented as $\{v_j\}_{j=1}^{N_v}$ and $\{t_k\}_{k=1}^{N_w}$, respectively. $N_v$ denotes a number of video segments in the video content 904, and $N_w$ denotes a number of sentences in the corresponding textual query 906. The visual feature of the $j^{th}$ segment of the video content 904 is represented by $v_j$. The textual feature of the $k^{th}$ sentence in the textual query 906 is represented $t_k$. Similarities are determined for all combinations of words and video segments from the video content 904 and textual query 906. Resulting segment-to-word (STW) similarity scores form the similarity matrix 912 and provide important cues to identify which word(s) and video segment(s) are crucial for retrieval of the video moment 902. The STW similarity score $s_{j,k}^m$ of the similarity matrix 912 indicates a similarity between the $j^{th}$ video segment and the $m^{th}$ word of the $k^{th}$ sentence, and is represented as follows:

$$s_{j,k}^m = \frac{v_j^T \cdot w_k^m}{\|v_j\|_2 \cdot \|w_k^m\|_2} \quad (10)$$

A normalized relevance of a word is determined with respect to each video segment based on the STW similarity scores as follows:

$$r_{j,k}^m = \frac{\exp(s_{j,k}^m)}{\sum_{j=1}^{N_v} \exp(s_{j,k}^m)} \quad (11)$$

wherein $r_{j,k}^m$ indicates a relative correlation of the $m^{th}$ word of the $k^{th}$ sentence of the textual query 906 and the $j^{th}$ video segment of the video content 904. The normalized relevance r is higher if the $j^{th}$ video segment $v_j$ is relevant to the $m^{th}$ word of the $k^{th}$ sentence, and lower if the $j^{th}$ video segment $v_j$ is less relevant or irrelevant to the $m^{th}$ word of the $k^{th}$ sentence.

A segment-attended sentence feature 916 is represented as follows:

$$t_{k,j} = \sum_{m=1}^{M} r_{j,k}^m \cdot w_k^m \quad (12)$$

where $t_{k,j}$ emphasizes the words of the $k^{th}$ sentence of the textual query 906 that are relevant to segment $v_j$ and suppress the rest irrelevant words in the textual query 1006. In some embodiments, a cosine similarity $c_{j,k}$ between the $j^{th}$ video segment and the $k^{th}$ sentence is calculated (524), e.g., using equation (1). A plurality of cosine similarities are derived between the visual features 908 of the video content 904 and the sentence feature 916 of the textual query 906. For example, a softmax operation is applied to each cosine similarity $c_{j,k}$ in a temporal domain to obtain a corresponding alignment score 920 ($S_{j,k}$), e.g., using equation (2). Such alignment scores 920 ($S_{j,k}$) are configured to highlight one or more video segments of the video content 904 that are associated with the $k^{th}$ sentence in the textual query 906. For each sentence, one or more respective video segments having the highest alignment scores 920 are identified to be associated with the respective sentence. As such, a subset of the video segments in the video content 904 (i.e., the video moment 902) can be retrieved for the textual query 506 made of the one or more sentences based on the alignment scores 512.

Figure 10:
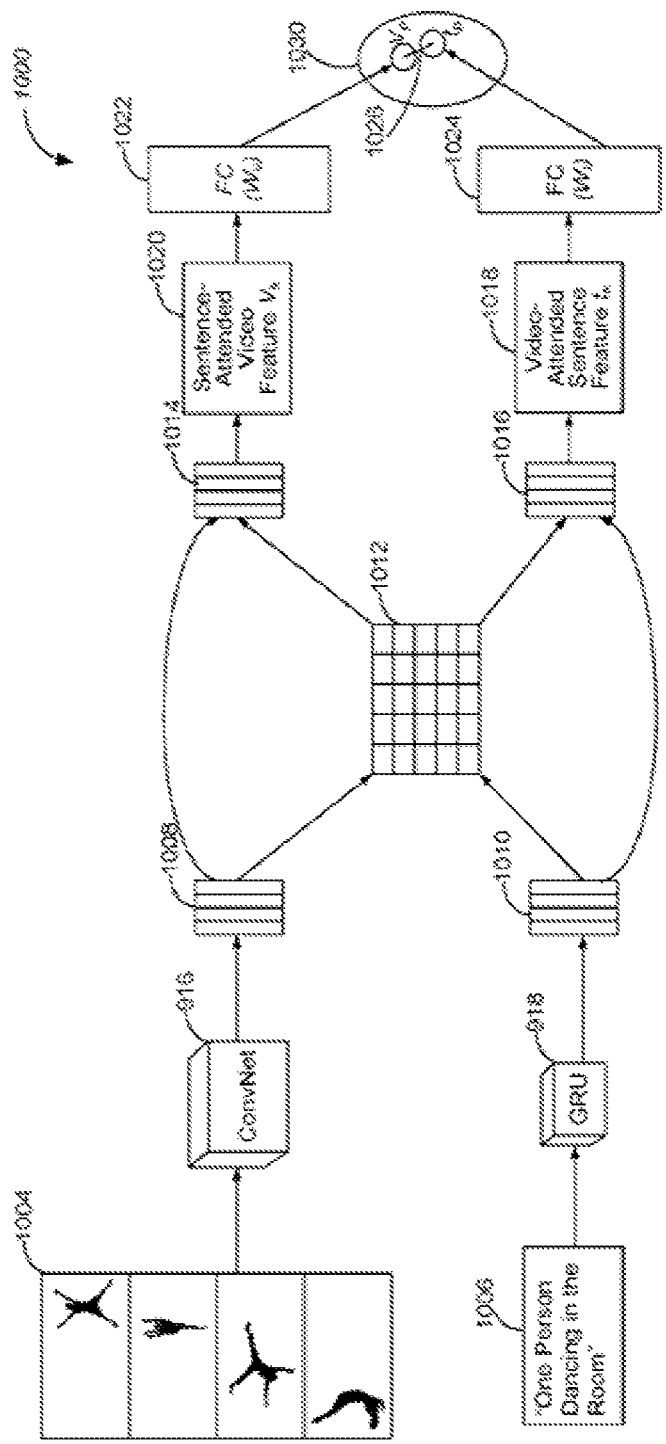
FIG. 10 illustrates a training process that determines deep learning models used in a video retrieval process shown in FIG. 9, in accordance with some embodiments.

FIG. 10 illustrates a training process 1000 that determines deep learning models used in a video retrieval process 900 shown in FIG. 9, in accordance with some embodiments. A training data set is applied to train a corresponding deep learning model (e.g., including the convolutional neural network 916 and recurrent neural network 516). The training data set includes a plurality of video training content items 1004 and corresponding training textual queries 1006, and is represented as $D=\{\{v_j^i\}_{j=1}^{N_v^i}, \{t_k^i\}_{j=1}^{N_w^i}\}_{i=1}^N$, where N is a number of video training content items 1004 in the training data set; $N_v^i$ and $N_w^i$ denote a number of video segments and a number of sentences for the $i^{th}$ video training content item 1004-$i$ and corresponding $i^{th}$ training textual query 1006-$i$, respectively; $v_j^i$ is the training visual feature 1008 of a $j^{th}$ segment of the $i^{th}$ video training content item 1004-$i$; $t_k^i$ is the training textual feature 1010 of a $k^{th}$ sentence of the $i^{th}$ training textual query 1006-$i$ corresponding to the $i^{th}$ video training content item 1004-$i$. It is noted that each training textual feature 1010 of a $k^{th}$ sentence is optionally a collection of textual features of words in the $k^{th}$ sentence.

The STW similarity scores of the similarity matrix 1012 ($s_{j,k}^m$) are calculated as follows:

$$s_{j,k}^m = \frac{v_j^T \cdot w_k^m}{\|v_j\|_2 \cdot \|w_k^m\|_2} \quad (13)$$

A superscription i denotes the $i^{th}$ data pair of the $i^{th}$ video training content item 1004-$i$ and corresponding $i^{th}$ training textual query 1006-$i$ in the training data set and has been simplified herein. The similarity matrix 1012 is normalized with respect to each video segment as follows:

$$r_{j,k}^m = \frac{\exp(s_{j,k}^m)}{\sum_{j=1}^{N_v^i} \exp(s_{j,k}^m)} \quad (14)$$

where $r_{j,k}^m$ is a normalized correlation of the $m^{th}$ word of the $k^{th}$ sentence of the $i^{th}$ training textual query 1006-$i$ and the $j^{th}$ video segment $v_j$ of the $i^{th}$ video training content item 1004-$i$. The normalized correlation $r_{j,k}^m$ is higher if the $j^{th}$ video segment of the $i^{th}$ video training content item 1004-$i$ contains a reference to the $m^{th}$ word of the $k^{th}$ sentence of the $i^{th}$ training textual query 1006-$i$. The normalized correlation $r_{j,k}^m$ is lower if the $j^{th}$ video segment $v_j$ of the $i^{th}$ video training content item 1004-$i$ is less relevant or irrelevant to the $m^{th}$ word of the $k^{th}$ sentence of the $i^{th}$ training textual query 1006-$i$.

A segment-attended sentence feature 1016 is represented as follows:

$$t_{k,j} = \sum_{m=1}^{M} r_{j,k}^m \cdot w_k^m \quad (15)$$

where $t_{k,j}$ emphasizes the words of the $k^{th}$ sentence of the $i^{th}$ training textual query 1006-$i$ that are relevant to segment $v_j$ and suppress the rest irrelevant words in the $i^{th}$ training textual query 1006-$i$.

In the training process 1000, sentence-attended video features 1020 and video-attended sentence features 1018 are generated from the video features 1008 and sentence feature 1016, and projected to a joint video-text space 1030. A pairwise triplet ranking loss $L_{triplet}$ is used to train a visual feature extraction model (e.g., the convolutional neural network 916), textual feature extraction model (e.g., a text decoder 918 including an RNN), and feature projection model (e.g., fully connected layers 1022 and 1024). Specifically, these models are trained jointly to minimize the triplet ranking loss $L_{triplet}$ in order to maximize the similarity between a video embedding $V_p$ and its matching text embedding $t_p$ and minimize the similarity of non-matching pairs in the joint video-text space 1030.

Specifically, in some embodiments, a normalized relevance of a video segment of each video training content item 1004 with respect to a $m^{th}$ word of a $k^{th}$ sentence of the corresponding textual query 1006 is determined from the STW similarity scores of the similarity matrix 1012 as follows:

$$l_{j,k}^m = \frac{\exp\left(s_{j,k}^m\right)}{\sum_{m=1}^M \exp\left(s_{j,k}^m\right)} \quad (16)$$

A word-attended video feature 1014 is generated as follows:

$$V_k^m = \sum_{j=1}^{N_v} l_{j,k}^m \cdot v_j \quad (17)$$

Word-attended video features 1014 ($V_k$) are combined to create a sentence-attended video feature 1020 ($V_k$) for the $k^{th}$ sentence of the textual query 906 as follows:

$$V_k = \sum_{m=1}^M V_k^m \quad (18)$$

where the sentence-attended video features 1020 ($V_k$) includes both semantic context of each word and a summary of video segments with respect to the training textual query 1006. Similarly, a video-attended sentence feature 1018 is generated by averaging segment-attended sentence features 1016 as follows:

$$t_k = \sum_{j=1}^{N_v^j} t_{k,j} \quad (19)$$

A video embedding $V_p$ is determined based on $V_p = W_v \cdot V_k$, and a text embedding $t_p$ is determined based on $t_p = W_t \cdot t_k$, where $W_v$ and $W_t$ represent fully-connected layers 1022 and 1024 that are configured to project the video features 1020 ($V_k$) and sentence features 1018 ($t_k$) to the joint video-text space 1030, respectively.

A triplet ranking loss $L_{triplet}$ is formally defined as:

$$L_{triplet} = \Sigma_{\{v_p, t_p\}} \{\Sigma_{t_p^-} \max[0, \Delta - s(v_p, t_p^-) + s(v_p, t_p^-)] + \Sigma_{p_q^-} \max[0, \Delta - s(t_p, v_p) + s(t_p, v_p^-)]\} \quad (20)$$

where $t_p$, $t_p^-$ represent a matching and a non-matching text embedding for video embedding $V_p$, respectively. Similarly, $V_p$, $V_p^-$ represent a matching and a non-matching video embedding for the text embedding $t_p$. $\Delta$ is the margin value for ranking. $s(\bullet,\bullet)$ is a scoring function that measures the similarity between two embeddings. In some embodiments, a cosine similarity is applied as the scoring function.

Figure 11A:
FIGS. 11A and 11B are two example video clips retrieved from video content based on textual queries, in accordance with some embodiments.
Figure 11B:
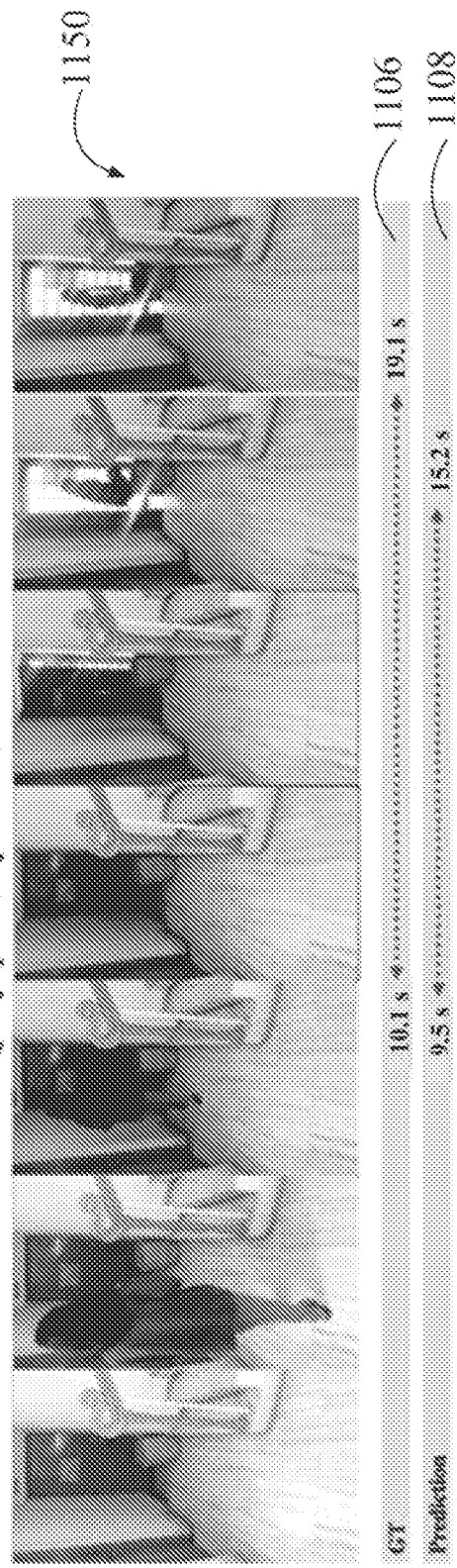

FIGS. 11A and 11B are two example video moments 1100 and 1150 retrieved from video content based on textual queries, in accordance with some embodiments. A visual feature extraction model, a textual feature extraction model, and a feature projection model are trained using the Charades-STA* dataset, which includes 12,408 text description-moment pairs for training and 3,720 text description items for testing. On average, a length of each text description is 8.6 words and a length of each video moment is 29.8 seconds. Referring to FIG. 11A, a training textual query includes "a person biting sandwich." A ground truth moment 1102 covers 5.3-10.8 seconds, while a subset of the training video content item (i.e., a predicted video moment 1104) extracted by the process 1000 covers 6.0-9.2 seconds. A length of the predicted video moment 1104 is shorter than that of the ground truth moment 1102, while 100% of the predicted video moment 1104 overlaps the ground truth moment 1102. Referring to FIG. 11B, a training textual query is "a person opens a door." A ground truth moment 1106 covers 10.1-19.1 seconds, while a subset of the training video content item (i.e., a predicted video moment 1108) extracted by the process 1000 covers 9.5-15.2 seconds. A length of the predicted video moment 1108 is shorter than that of the ground truth moment 1106, while 89.5% of the predicted video moment 1108 overlaps the ground truth moment 1106.

Rank-based performance metrics are applied. For example, a percentage of at least one of the top-K retrieved video moments is monitored for having an Intersection of Union (IoU) to a ground-truth moment that is larger than a threshold m. In some embodiments, a sliding window of 128 and 256 image frames to obtain candidate video moments.

TABLE 3

Performance evaluation results for the Charades-STA dataset ($K \in \{1, 5, 10\}$, $m \in \{0.3, 0.5, 0.7\}$).

| | IoU = 0.3 | | | IoU = 0.5 | | | IoU = 0.7 | | |
|---|---|---|---|---|---|---|---|---|---|
| Method | R @ 1 | R @ 5 | R @ 10 | R @ 1 | R @ 5 | R @ 10 | R @ 1 | R @ 5 | R @ 10 |
| Proposed | 33.92 | 87.53 | 98.58 | 20.38 | 63.31 | 84.84 | 9.05 | 29.36 | 45.67 |

Referring to Table 3, in some embodiments, the computer system determines a first percentage of the top one retrieved video moments having a first IOU to respective ground-truth moments that is larger than 0.3. The first percentage is greater than 30% based on the processes 900 and 1000. The computer system also determines a second percentage of at least one of top 5 retrieved video moments having the first IOU to the respective ground-truth moments (i.e., the first IOU>0.3). The second percentage increases to be greater than 80%. The computer system also determines a third percentage of at least one of top 10 retrieved video moments having the first IOU to the respective ground-truth moments (i.e., the first IOU>0.3). The third percentage increases to be greater than 95%. Alternatively, in some embodiments, the computer system determines a first percentage of the top one retrieved video moments having a second IOU to respective ground-truth moments that is larger than 0.5. The first percentage is greater than 15% for the processes 500 and 600. The computer system also determines a second percentage of at least one of top 5 retrieved video moments having the second IOU to the respective ground-truth moments (i.e., the second IOU>0.5). The second percentage increases to be greater than 60%. The computer system also determines a third percentage of at least one of top 10 retrieved video moments having the second IOU to the respective ground-truth moments (i.e., the second IOU>0.5). The third percentage increases to be greater than 80%. Additionally and alternatively, in some embodiments, the computer system determines a first percentage of the top one retrieved video moments having a third IOU to respective ground-truth moments that is larger than 0.7. The first percentage is greater than 5% for the processes 500 and 600. The computer system also determines a second percentage of at least one of top 5 retrieved video moments having the third IOU to the respective ground-truth moments (i.e., the third IOU>0.7). The second percentage increases to be greater than 25%. The computer system also determines a third percentage of at least one of top 10 retrieved video moments having the third IOU to the respective ground-truth moments (i.e., the third IOU>0.7). The third percentage increases to be greater than 45%. As such, the process 900 significantly outperforms a random method that randomly selects a video moment for a text query, and performs comparably to a state-of-the-art fully-supervised method (CTRL), thereby confirming that the process 900 has managed to align a textual query and a video moment effectively without annotating temporal boundaries.

Figure 12:
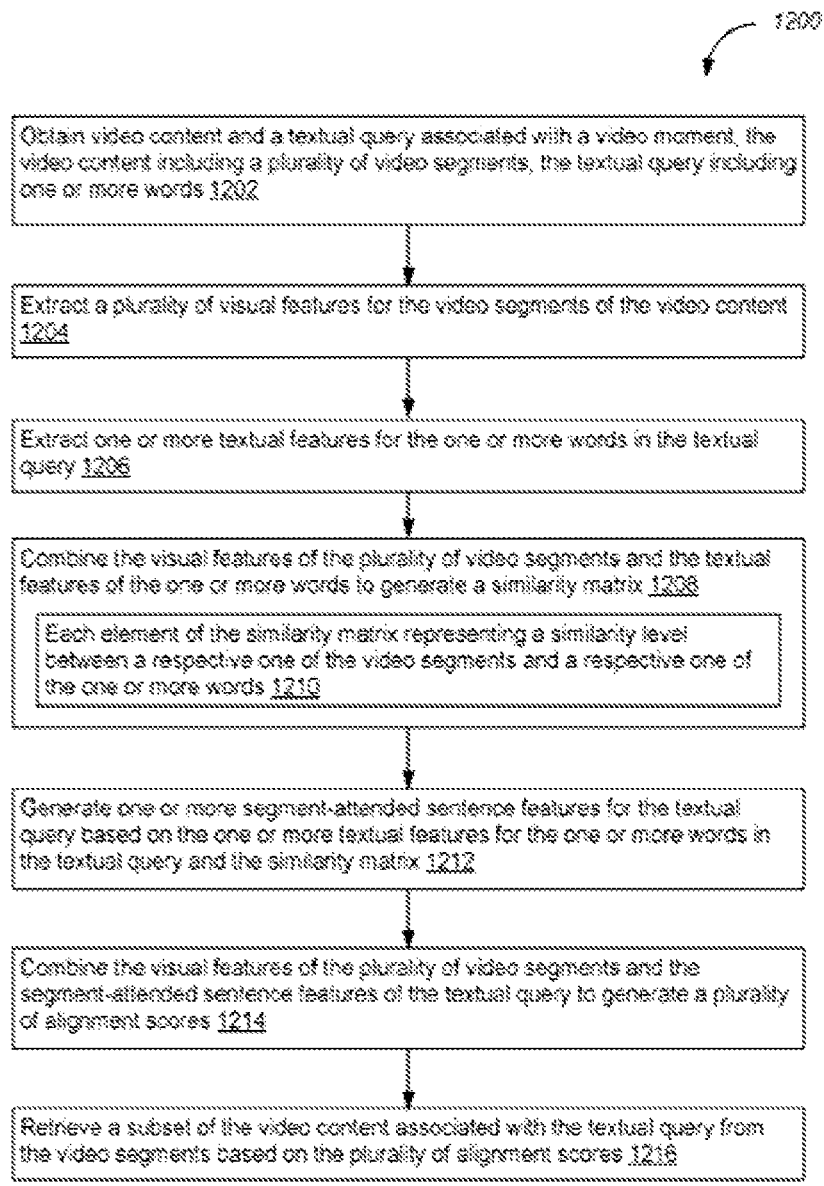
FIG. 12 is a flowchart of a video retrieval method, in accordance with some embodiments.

FIG. 12 is a flowchart of a video retrieval method 1200, in accordance with some embodiments. For convenience, the method 1200 is described as being implemented by a computer system (e.g., a client device 104, a server 102, or a combination thereof). An example of the client device 104 is a mobile phone. In an example, the method 1200 is applied to identify a video moment 902 from video content 904 based on a textual query 906, and the video moment 902 is captured by a surveillance camera and streamed to a server 102. Method 1200 is, optionally, governed by instructions that are stored in a non-transitory computer readable storage medium and that are executed by one or more processors of the computer system. Each of the operations shown in FIG. 12 may correspond to instructions stored in a computer memory or non-transitory computer readable storage medium (e.g., memory 206 of the system 200 in FIG. 2). The computer readable storage medium may include a magnetic or optical disk storage device, solid state storage devices such as Flash memory, or other non-volatile memory device or devices. The instructions stored on the computer readable storage medium may include one or more of: source code, assembly language code, object code, or other instruction format that is interpreted by one or more processors. Some operations in method 1200 may be combined and/or the order of some operations may be changed.

The computer system obtains (1202) video content 904 and a textual query 906 associated with a video moment 902. The video content 904 includes a plurality of video segments, and the textual query 906 includes one or more words. A plurality of visual features 908 are extracted (1204) for the video segments of the video content 904. One or more textual features 910 are extracted (1206) for the one or more words in the textual query 906. The visual features 908 of the plurality of video segments and the textual features 910 of the one or more words are combined (1208) to generate a similarity matrix 912. Each element of the similarity matrix 912 represents (1210) a similarity level between a respective one of the video segments and a respective one of the one or more words. The computer system generates (1212) one or more segment-attended sentence features 916 for the textual query 906 based on the one or more textual features 910 for the one or more words in the textual query 906 and the similarity matrix 912, and combines (1214) the visual features 908 of the plurality of video segments and the segment-attended sentence features 916 of the textual query 906 to generate a plurality of alignment scores 920. A subset of the video content 904 (i.e., the video moment 902) associated with the textual query 906 are retrieved (1216) from the video segments based on the plurality of alignment scores 920.

Referring to FIG. 10, in some embodiments, training data includes a plurality of training video content items 1004 and training textual query items 1006. For each training video content item 1004 and its corresponding textual query item 1006, a video-attended training sentence feature 1018 is generated for the words in the training textual query item 1006 based on training textual features 1010 of the one or more words and a training similarity matrix 1012. A sentence-attended training video feature 1020 for segments in the training video content item 1004 is also generated based on training video features 1008 of the video segments in the training video content item 1004 and the training similarity matrix 1012. The sentence-attended training video feature 1020 and the video-attended training sentence feature 1018 are projected to a joint video-text space 1030. The subset of the training video content item is retrieved from the video segments in accordance with projection of the sentence-attended training video feature 1020 and the video-attended training sentence feature 1018 in the joint video-text space 1030. Further, in some embodiments, the training visual features 1008 and training textual features 1010 are extracted based on a visual feature extraction model and a textual feature extraction model, respectively, and the sentence-attended training video feature 1020 and the video-attended training sentence feature 1018 are projected to the joint video-text space 1030 based on a feature projection model (e.g., two fully connected layers 1022 and 1024). These models are trained using the training data based on a loss function L (e.g., a triplet ranking loss $L_{triplet}$). Specifically, in some embodiments, for each video training content item 1004 and associated training query item 1006, the computer system determines a distance 1026 of the sentence-attended training video feature 1020 and the video-attended training sentence feature 1018 in the joint video-text space 1030, and adjusts the visual feature extraction model, the textual feature extraction model, and the feature projection model to minimize the distance 1026. Alternatively, in some embodiments, the computer system adjusts the visual feature extraction model, the textual feature extraction model, and the feature projection model to minimize the loss function L. The loss function L includes a triplet ranking loss $L_{triplet}$.

In some embodiments, the plurality of visual features 908 are extracted for the video segments of the video content 904 using a convolutional neural network 916. Further, in some embodiments, each video segment includes a predefined number of consecutive image frames (e.g., 16 frames), and the convolutional neural network 916 includes a C3D model. In some embodiments, the one or more textual features 910 are extracted for the one or more words based a GRU.

The visual features 908 of the plurality of video segments and the textual features 910 of the one or more sentences are combined to generate the similarity matrix 912. In some embodiments, for each video segment, the computer system generates a similarity between the respective video segment and each word in the textual query 906, e.g., using the visual feature 908 of each video segment and the textual features 910 of each word. A softmax operation is applied to the similarity in a temporal domain to obtain a respective element of the similarity matrix 912 for each word in the textual query 906. The respective element of the similarity matrix 912 indicates a correlation level between the respective video segment and each word in the textual query 906.

In some embodiments, the textual query 906 is closely associated with the subset of the video content 904, and loosely associated with the video content 904. For example, the textual query 906 describes 90% of the subset of the video content, and however, only describes less than 40% of the entire video content 904. Alternatively and specifically, in some embodiments, the video content 904 is not trimmed and corresponds to a first duration of time, and the textual query 906 corresponds to a second duration of time that is equal to or less than the first duration of time. The subset of video content corresponds to a third duration of time that is substantially equal to the second duration of time, i.e., a difference between the second and third durations of time is less than a threshold percentage (such as 5%) of each other.

In some embodiments, the computer system includes a user application 224 configured to display a user interface for receiving the textual query 906 and presenting the video moment 902 with reference to the video content 904. In an example, the video content 904 is captured by a surveillance camera and streamed to a server 102. The method 1200 is implemented at the server 102 to identify the video moment 902. The user interface is enabled on a mobile device of a user for receiving the textual query 906 and presenting the video moment 902 with reference to the video content 904.

It should be understood that the particular order in which the operations in FIG. 12 have been described are merely exemplary and are not intended to indicate that the described order is the only order in which the operations could be performed. One of ordinary skill in the art would recognize various ways to identify human poses as described herein. Additionally, it should be noted that details of other processes described above with respect to FIGS. 9-11 are also applicable in an analogous manner to method 1200 described above with respect to FIG. 12. For brevity, these details are not repeated here.

The terminology used in the description of the various described implementations herein is for the purpose of describing particular implementations only and is not intended to be limiting. As used in the description of the various described implementations and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. Additionally, it will be understood that, although the terms "first," "second," etc. may be used herein to describe various elements, these elements should not be limited by these terms. These terms are only used to distinguish one element from another.

As used herein, the term "if" is, optionally, construed to mean "when" or "upon" or "in response to determining" or "in response to detecting" or "in accordance with a determination that," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]" or "in accordance with a determination that [a stated condition or event] is detected," depending on the context.

The foregoing description, for purpose of explanation, has been described with reference to specific embodiments. However, the illustrative discussions above are not intended to be exhaustive or to limit the claims to the precise forms disclosed. Many modifications and variations are possible in view of the above teachings. The embodiments were chosen and described in order to best explain principles of operation and practical applications, to thereby enable others skilled in the art.

Although various drawings illustrate a number of logical stages in a particular order, stages that are not order dependent may be reordered and other stages may be combined or broken out. While some reordering or other groupings are specifically mentioned, others will be obvious to those of ordinary skill in the art, so the ordering and groupings presented herein are not an exhaustive list of alternatives. Moreover, it should be recognized that the stages can be implemented in hardware, firmware, software or any combination thereof.

What is claimed is:

1. A method for video moment retrieval, comprising:
   obtaining video content and a textual query associated with a video moment, the video content comprising a plurality of video segments, the textual query comprising one or more words;
   extracting a plurality of visual features for the video segments of the video content;
   extracting one or more textual features for the one or more words in the textual query;
   combining the visual features of the plurality of video segments and the textual features of the one or more words to generate a similarity matrix, each element of the similarity matrix representing a similarity level between a respective one of the video segments and a respective one of the one or more words;
   generating one or more segment-attended sentence features for the textual query based on the one or more textual features for the one or more words in the textual query and the similarity matrix;
   combining the visual features of the plurality of video segments and the segment-attended sentence features of the textual query to generate a plurality of alignment scores; and
   retrieving a subset of the video content associated with the textual query from the video segments based on the plurality of alignment scores.

2. The method of claim 1, further comprising, for each training video content item and a corresponding training textual query item in training data comprising a plurality of training video content items and training textual query items:
   generating a video-attended training sentence feature for words in the training textual query item based on training textual features of the words in the training textual query item and a corresponding training similarity matrix;
generating a sentence-attended training video feature for segments in the training video content item based on training video features of the video segments in the training video content item and the training similarity matrix;
projecting the sentence-attended training video feature and the video-attended training sentence feature to a joint video-text space; and
wherein a subset of the training video content is retrieved from the video segments in accordance with projection of the sentence-attended training video feature and the video-attended training sentence feature in the joint video-text space.

3. The method of claim 2, wherein the visual features and textual features are extracted based on a visual feature extraction model and a textual feature extraction model, respectively, and for each training video content item, the sentence-attended training video feature and the video-attended training sentence feature are projected to the joint video-text space based on a feature projection model, the method further comprising:
training the visual feature extraction model, the textual feature extraction model, and the feature projection model using the training data based on a loss function L.

4. The method of claim 3, wherein training the visual feature extraction model, the textual feature extraction model, and the feature projection model further comprises:
for each training video content item and associated training query item, determining, in the joint video-text space, a distance of the sentence-attended training video feature and the video-attended training sentence feature, and
adjusting the visual feature extraction model, the textual feature extraction model, and the feature projection model to minimize the distance.

5. The method of claim 3, wherein training the visual feature extraction model, the textual feature extraction model, and the feature projection model further comprises:
adjusting the visual feature extraction model, the textual feature extraction model, and the feature projection model to minimize the loss function L, wherein the loss function L comprises a triplet ranking loss $L_{triplet}$.

6. The method of claim 1, wherein the plurality of visual features are extracted for the video segments of the video content using a convolutional neural network.

7. The method of claim 6, wherein each video segment comprises a predefined number of consecutive image frames, and the convolutional neural network comprises a C3D model.

8. The method of claim 1, wherein the one or more textual features are extracted for the one or more words based a Gated Recurrent Unit (GRU).

9. The method of claim 1, wherein combining the visual features of the plurality of video segments and the textual features of the one or more sentences to generate the similarity matrix further comprises:
for each video segment:
generating a similarity between the respective video segment and each word in the textual query; and
applying a softmax operation to the similarity in a temporal domain to obtain a respective element of the similarity matrix for each word in the textual query, the respective element of the similarity matrix indicating a correlation level between the respective video segment and each word in the textual query.

10. The method of claim 1, wherein the textual query is closely associated with the subset of the video content, and loosely associated with the video content.

11. The method of claim 1, wherein the video content is not trimmed and corresponds to a first duration of time, and the textual query corresponds to a second duration of time that is equal to or less than the first duration of time, and wherein the subset of video content corresponds to a third duration of time that is substantially equal to the second duration of time.

12. The method of claim 1, wherein obtaining the video content and textual query comprises obtaining a Charades-STA dataset that has 12408 text description-moment pairs, the method further comprising:
computing a first percentage of a top one retrieved video moments having a first intersection over union (IOU) to respective ground-truth moments that is larger than 0.3, the first percentage being greater than 30%;
computing a second percentage of at least one of top 5 retrieved video moments having the first IOU to the respective ground-truth moments, the second percentage being greater than 80%; and
computing a third percentage of at least one of top 10 retrieved video moments having the first IOU to the respective ground-truth moments, the third percentage being greater than 95%.

13. The method of claim 1, wherein obtaining the video content and textual query comprises obtaining a Charades-STA dataset that has 12408 text description-moment pairs, the method further comprising:
computing a first percentage of a top one retrieved video moments having a second intersection over union (IOU) to respective ground-truth moments that is larger than 0.5, the first percentage being greater than 15%;
computing a second percentage of at least one of top 5 retrieved video moments having the second IOU to the respective ground-truth moments, the second percentage being greater than 60%; and
computing a third percentage of at least one of top 10 retrieved video moments having the second IOU to the respective ground-truth moments, the third percentage being greater than 80%.

14. The method of claim 1, wherein obtaining the video content and textual query comprises obtaining a Charades-STA dataset that has 12408 text description-moment pairs, the method further comprising:
computing a first percentage of a top one retrieved video moments having a third intersection over union (IOU) to respective ground-truth moments that is larger than 0.7, the first percentage being greater than 5%;
computing a second percentage of at least one of top 5 retrieved subsets of video moments having the third IOU to the respective ground-truth moments, the second percentage being greater than 25%; and
computing a third percentage of at least one of top 10 retrieved video moments having the third IOU to the respective ground-truth moments, the third percentage being greater than 45%.

15. The method of claim 1, further comprising:
enabling a user interface for receiving the textual query and presenting the video moment with reference to the video content.

16. A computer system, comprising:
one or more processors; and a memory having instructions stored thereon, which when executed by the one or more processors cause the processors to perform a method for video moment retrieval;

wherein the method comprises:

obtaining video content and a textual query associated with a video moment, the video content comprising a plurality of video segments, the textual query comprising one or more words;

extracting a plurality of visual features for the video segments of the video content;

extracting one or more textual features for the one or more words in the textual query;

combining the visual features of the plurality of video segments and the textual features of the one or more words to generate a similarity matrix, each element of the similarity matrix representing a similarity level between a respective one of the video segments and a respective one of the one or more words;

generating one or more segment-attended sentence features for the textual query based on the one or more textual features for the one or more words in the textual query and the similarity matrix;

combining the visual features of the plurality of video segments and the segment-attended sentence features of the textual query to generate a plurality of alignment scores; and retrieving a subset of the video content associated with the textual query from the video segments based on the plurality of alignment scores.

17. The computer system of claim 16, wherein the method further comprises, for each training video content item and a corresponding training textual query item in training data comprising a plurality of training video content items and training textual query items:

generating a video-attended training sentence feature for words in the training textual query item based on training textual features of the words in the training textual query item and a corresponding training similarity matrix;

generating a sentence-attended training video feature for segments in the training video content item based on training video features of the video segments in the training video content item and the training similarity matrix;

projecting the sentence-attended training video feature and the video-attended training sentence feature to a joint video-text space; and wherein a subset of the training video content is retrieved from the video segments in accordance with projection of the sentence-attended training video feature and the video-attended training sentence feature in the joint video-text space.

18. The computer system of claim 17, wherein the visual features and textual features are extracted based on a visual feature extraction model and a textual feature extraction model, respectively, and for each training video content item, the sentence-attended training video feature and the video-attended training sentence feature are projected to the joint video-text space based on a feature projection model, the method further comprising:

training the visual feature extraction model, the textual feature extraction model, and the feature projection model using the training data based on a loss function L.

19. The computer system of claim 18, wherein the training the visual feature extraction model, the textual feature extraction model, and the feature projection model further comprises:

for each training video content item and associated training query item, determining, in the joint video-text space, a distance of the sentence-attended training video feature and the video-attended training sentence feature, and adjusting the visual feature extraction model, the textual feature extraction model, and the feature projection model to minimize the distance.

20. A non-transitory computer-readable medium, having instructions stored thereon, which when executed by one or more processors cause the processors to perform a method for video moment retrieval, wherein the method comprises:

obtaining video content and a textual query associated with a video moment, the video content comprising a plurality of video segments, the textual query comprising one or more words;

extracting a plurality of visual features for the video segments of the video content;

extracting one or more textual features for the one or more words in the textual query;

combining the visual features of the plurality of video segments and the textual features of the one or more words to generate a similarity matrix, each element of the similarity matrix representing a similarity level between a respective one of the video segments and a respective one of the one or more words;

generating one or more segment-attended sentence features for the textual query based on the one or more textual features for the one or more words in the textual query and the similarity matrix;

combining the visual features of the plurality of video segments and the segment-attended sentence features of the textual query to generate a plurality of alignment scores; and retrieving a subset of the video content associated with the textual query from the video segments based on the plurality of alignment scores.

* * * * *